US011019595B2

(12) United States Patent
Yu et al.

(10) Patent No.: US 11,019,595 B2
(45) Date of Patent: May 25, 2021

(54) PAGING METHOD AND DEVICE

(71) Applicant: Huawei Technologies Co., Ltd., Shenzhen (CN)

(72) Inventors: Yinghui Yu, Beijing (CN); Hui Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 15/492,950

(22) Filed: Apr. 20, 2017

(65) Prior Publication Data
US 2017/0223661 A1    Aug. 3, 2017

Related U.S. Application Data

(63) Continuation of application No. PCT/CN2014/088989, filed on Oct. 20, 2014.

(51) Int. Cl.
H04W 68/00 (2009.01)
H04W 4/70 (2018.01)
H04L 29/06 (2006.01)
H04W 4/18 (2009.01)
H04W 68/02 (2009.01)
(Continued)

(52) U.S. Cl.
CPC ........... H04W 68/005 (2013.01); H04L 69/22 (2013.01); H04L 69/323 (2013.01); H04W 4/18 (2013.01); H04W 4/70 (2018.02); H04W 68/025 (2013.01); H04W 72/042 (2013.01);
(Continued)

(58) Field of Classification Search
CPC . H04W 4/70; H04W 72/042; H04W 72/0446; H04W 68/005; H04W 4/18; H04W 76/28; H04L 69/22; H04L 69/323; Y02D 70/24; Y02D 70/21
See application file for complete search history.

(56) References Cited

U.S. PATENT DOCUMENTS 10,104,694 B2 * 10/2018 Lee ................... H04W 74/0833
2014/0038647 A1    2/2014 Zhang et al.
(Continued)

FOREIGN PATENT DOCUMENTS

CN          101060713 A       10/2007
CN          102256340 A  *    11/2011 ............ H04W 68/02
(Continued)

OTHER PUBLICATIONS

Li et al., "Paging Method of Cluster Groups", Jul. 10, 2013, Chinese Patent Office, CN103200535A, English machine language translation (Year: 2013).*
(Continued)

Primary Examiner — Ricky Q Ngo
Assistant Examiner — Michael K Phillips
(74) Attorney, Agent, or Firm — Leydig, Voit & Mayer, Ltd.

(57) ABSTRACT

Embodiments of the present invention disclose a paging method and a device. The method includes: first, determining, by a base station, a radio superframe identifier of a paging message that is of user equipment and that is in a physical layer frame, where the radio superframe identifier is used to indicate a radio superframe in which the paging message is located; then, determining a first location identifier of the paging message in the radio superframe.

10 Claims, 8 Drawing Sheets

(51) Int. Cl.
*H04L 29/08* (2006.01)
*H04W 76/28* (2018.01)
*H04W 72/04* (2009.01)

(52) U.S. Cl.
CPC ....... *H04W 72/0446* (2013.01); *H04W 76/28* (2018.02); *Y02D 30/70* (2020.08)

(56) References Cited

U.S. PATENT DOCUMENTS

| | | | |
|---|---|---|---|
| 2014/0198696 A1 | 7/2014 | Li et al. | |
| 2015/0103768 A1 | 4/2015 | Chen et al. | |
| 2015/0237577 A1 | 8/2015 | Zhang et al. | |
| 2015/0249972 A1* | 9/2015 | You | H04L 5/001 370/254 |
| 2016/0029434 A1* | 1/2016 | Qiu | H04W 52/0209 370/311 |
| 2016/0105926 A1* | 4/2016 | Diachina | H04W 4/70 370/329 |
| 2016/0127918 A1* | 5/2016 | Yi | H04W 84/047 370/329 |
| 2016/0183231 A1* | 6/2016 | Shi | H04W 72/0446 370/329 |
| 2016/0345119 A1* | 11/2016 | Futaki | H04W 72/0446 |
| 2017/0006644 A1* | 1/2017 | Tsuboi | H04L 69/28 |
| 2017/0164250 A1* | 6/2017 | Kim | H04W 36/30 |

FOREIGN PATENT DOCUMENTS

| | | | | |
|---|---|---|---|---|
| CN | 102256340 | A | | 11/2011 |
| CN | 102857869 | A | | 1/2013 |
| CN | 102970750 | A | | 3/2013 |
| CN | 103200535 | A * | | 7/2013 |
| CN | 103200535 | A | | 7/2013 |
| CN | 103378939 | A | | 10/2013 |
| CN | 103444248 | A * | 12/2013 | .......... H04W 68/005 |
| CN | 103444248 | A | | 12/2013 |
| EP | 2844010 | A1 | | 3/2015 |
| WO | WO 2012109765 | A1 | | 8/2012 |
| WO | WO 2013143066 | A1 | | 10/2013 |
| WO | WO-2014071551 | A1 * | 5/2014 | ............ H04W 68/02 |
| WO | WO 2014071551 | A1 | | 5/2014 |

OTHER PUBLICATIONS

Zhaohua et al., "Method for Paging Terminal in Idle Mode, Advanced Network Element Equipment and System", Nov. 23, 2011, Chinese Patent Office, CN102256340A, English machine language translation (Year: 2011).*

Hu et al., "Method for Paging UE, Base Station and UE", May 15, 2014, WIPO, WO2014071551A, English machine language translation (Year: 2014).*

Pekonen et al., "Paging Control Method and Apparatus", Dec. 11, 2013, Chinese Patent Office, CN103444248A, English machine language translation (Year: 2013).*

"3$^{rd}$ Generation Partnership Project; Technical Specification Group Radio Access Network; Evolved Universal Terrestrial Radio Access (E-UTRA); User Equipment (UE) procedures in idle mode (Release 12)," 3GPP TS 36.304 V12.2.0, pp. 1-37, 3$^{rd}$ Generation Partnership Project, Valbonne, France (Sep. 2014).

"3$^{rd}$ Generation Partnership Project; Technical Specification Group Radio Access Network; Evolved Universal Terrestrial Radio Access (E-UTRA); User Equipment (UE) radio access capabilities (Release 12)," 3GPP TS 36.306 V12.2.0, pp. 1-32, 3$^{rd}$ Generation Partnership Project, Valbonne, France (Sep. 2014).

"3$^{rd}$ Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.3.0, pp. 1-57, 3$^{rd}$ Generation Partnership Project, Valbonne, France (Sep. 2014).

"3$^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.3.0, pp. 1-378, 3$^{rd}$ Generation Partnership Project, Valbonne, France (Sep. 2014).

"3$^{rd}$ Generation Partnership Project; Technical Specification Group Radio Access Network; Evolved Universal Terrestrial Radio Access Network (E-UTRAN); S1 Application Protocol (S1AP) (Release 12)," 3GPP TS 36.413 V12.3.0, pp. 1-290, 3$^{rd}$ Generation Partnership Project, Valbonne, France (Sep. 2014).

CN/201910041386.3, Office Action/Search Report, dated Feb. 4, 2021.

* cited by examiner

PAGING METHOD AND DEVICE

CROSS-REFERENCE TO RELATED APPLICATIONS

This application is a continuation of International Application No. PCT/CN2014/088989, filed on Oct. 20, 2014, the disclosure of which is hereby incorporated by reference in its entirety.

TECHNICAL FIELD

The embodiments of the present invention relates to the field of communications technologies, and specifically, to a paging method and a device.

BACKGROUND

Machine to machine (M2M) is short for mutually transferring information and data between machines by using a radio network, and is also referred to as machine type communication. M2M is an important direction for future development of mobile communication. In the machine type communication, a base station may send a paging message to user equipment (UE) in an idle state and a connected state, where the paging message may be used to notify the UE of a system information update and instruct the UE to receive information about an earthquake and tsunami warning system (ETWS), a commercial mobile alert service (CMAS), or the like.

Currently, a base station sends a corresponding paging message to UE in a paging occasion (PO) of a discontinuous reception paging cycle, where a paging message sent by the base station in one PO may include a paging message sent by the base station to multiple UEs. That is, multiple UEs may share one PO, and a radio frame including one or more POs is referred to as a paging frame (PF). In a discontinuous reception paging cycle, after specific locations of a PF and a PO are calculated, the UE monitors a physical downlink control channel (PDCCH) in the corresponding PO. If the UE finds, by means of monitoring, a paging radio network temporary identifier (P-RNTI) in the corresponding PO, the UE acquires a corresponding paging message from a physical downlink shared channel (PDSCH) in the PO according to a radio bearer (RB) allocation manner and a modulation and coding scheme that are indicated by the PDCCH.

To meet requirements of an M2M system for low power consumption, low complexity, and deep coverage, a new access technology is introduced, and the new access technology is characterized by an extremely narrow system broadband. To meet the requirement of the M2M for low power consumption, a frame structure of a physical layer frame in the new access technology is newly set, and the newly set physical layer frame includes a hyperframe, where one hyperframe includes power-of-2 radio superframes, and one radio superframe includes power-of-2 radio frames. However, in the conventional art, no related paging technology is provided for an M2M system that uses the newly set physical layer frame. Therefore, the prior art cannot meet support requirements for a downlink service.

SUMMARY

Embodiments of the present invention disclose a paging method and a device, and provide a paging method for a newly set physical layer frame, which meets support of a base station for a downlink service and reduces power consumption of the base station and the user equipment.

A first aspect of the embodiments of the present invention discloses a base station, including:

a determining module, configured to: determine a radio superframe identifier of a paging message that is of user equipment and that is in a physical layer frame, and determine, based on the radio superframe identifier, a first location identifier of the paging message in the radio superframe, where the radio superframe identifier is used to indicate the radio superframe in which the paging message is located, the first location identifier is used to indicate a target location of the paging message in the radio superframe, and the first location identifier includes a downlink control information interval identifier or a radio frame identifier;

an adding module, configured to add the paging message to the corresponding target location based on the first location identifier; and an output module, configured to send, to the user equipment and on a paging channel corresponding to a coverage range class of the user equipment, the physical layer frame that carries the paging message.

In a first possible implementation manner of the first aspect of the embodiments of the present invention, the determining module is further configured to determine the coverage range class of the user equipment, where the coverage range class is used to represent a coverage degree of the base station for the user equipment.

With reference to the first aspect of the embodiments of the present invention or the first possible implementation manner of the first aspect of the embodiments of the present invention, in a second possible implementation manner of the first aspect of the embodiments of the present invention, a specific manner in which the determining module determines the radio superframe identifier of the paging message that is of the user equipment and that is in the physical layer frame is:

determining, according to formula (1), the radio superframe identifier of the paging message that is of the user equipment and that is in the physical layer frame, where formula (1) is:

$$SFN \bmod T = (T \text{ div } N) * (UE\_ID \bmod N), \text{ where}$$

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

With reference to the second possible implementation manner of the first aspect of the embodiments of the present invention, in a third possible implementation manner of the first aspect of the embodiments of the present invention, when the first location identifier is the downlink control information interval identifier, the first location identifier is used to indicate a downlink control information interval of the paging message in the radio superframe; and a specific manner in which the determining module determines, based on the radio superframe identifier, the first location identifier of the paging message in the radio superframe is:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$$I\_S_1 = \text{floor}(UE\_ID/Y) \bmod Ns_i, \text{ and}$$

formula (3) is:

$$I\_S_1 = \text{floor}(UE\_ID/Y) \bmod (Ns_w * R\_class\_worst/R\_class\_i), \text{ where}$$

$I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

With reference to the second possible implementation manner of the first aspect of the embodiments of the present invention, in a fourth possible implementation manner of the first aspect of the embodiments of the present invention, when the first location identifier is the radio frame identifier, the first location identifier is used to indicate a radio frame of the paging message in the radio superframe; and a specific manner in which the determining module determines, based on the radio superframe identifier, the first location identifier of the paging message in the radio superframe is:

determining, based on the radio superframe identifier, the radio superframe in which the paging message is located; and determining, according to formula (4), a radio frame identifier of the radio frame of the paging message in the radio superframe, where formula (4) is:

$$I\_S_2 = \text{floor}(UE\_ID/Y) \bmod Ns_i, \text{ where}$$

$I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

With reference to any implementation manner of the first possible implementation manner, the second possible implementation manner, the third possible implementation manner, or the fourth possible implementation manner of the first aspect of the embodiments of the present invention, in a fifth possible implementation manner of the first aspect of the embodiments of the present invention, a specific manner in which the determining module determines the coverage range class of the user equipment is:

acquiring the coverage range class of the user equipment from uplink data sent by the user equipment; or detecting access performance of uplink information of the user equipment in different coverage range classes, and selecting the coverage range class of the user equipment according to the access performance; or determining that a coverage range class of the user equipment stored in the base station is the coverage range class of the user equipment; or acquiring the coverage range class of the user equipment from a core network, where the core network stores a coverage range class of the user equipment that is sent by the base station to the core network when the user equipment changes from a connected state to an idle state, or the core network stores a coverage range class of the user equipment that is sent by the user equipment to the core network when the user equipment changes from a connected state to an idle state.

With reference to the third possible implementation manner of the first aspect of the embodiments of the present invention, in a sixth possible implementation manner of the first aspect of the embodiments of the present invention, the downlink control information interval includes a data part used for carrying the paging message.

With reference to the sixth possible implementation manner of the first aspect of the embodiments of the present invention, in a seventh possible implementation manner of the first aspect of the embodiments of the present invention, the downlink control information interval further includes a downlink control information scheduling part, the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

With reference to the first aspect of the embodiments of the present invention, in an eighth possible implementation manner of the first aspect of the embodiments of the present invention, the paging message includes a paging message list and a message change indication, the paging message list includes a user equipment identifier of each user equipment and a paging domain of each user equipment, and user equipment identifiers of different user equipments are different; or the paging message includes at least two group paging lists, and includes a message change indication and a list identifier of each group paging list, where each group paging list includes a user equipment identifier and a corresponding paging domain that are of user equipment in the group paging list, and user equipment identifiers of different user equipments are different.

With reference to the eighth possible implementation manner of the first aspect of the embodiments of the present invention, in a ninth possible implementation manner of the first aspect of the embodiments of the present invention, the message change indication includes at least one of a system message change indication, an earthquake and tsunami warning system change indication, a commercial mobile alert service change indication, or an extended access barring parameter change indication.

A second aspect of the embodiments of the present invention discloses a base station, including a memory and a processor, where the memory stores a group of program code, and the processor is configured to invoke the program code stored in the memory and is configured to execute the following operations:

determining a radio superframe identifier of a paging message that is of user equipment and that is in a physical layer frame, where the radio superframe identifier is used to indicate a radio superframe in which the paging message is located;

determining, based on the radio superframe identifier, a first location identifier of the paging message in the radio superframe, where the first location identifier is used to indicate a target location of the paging message in the radio superframe, and the first location identifier includes a downlink control information interval identifier or a radio frame identifier;

adding the paging message to the corresponding target location based on the first location identifier; and sending, to the user equipment and on a paging channel corresponding to a coverage range class of the user equipment, the physical layer frame that carries the paging message.

In a first possible implementation manner of the second aspect of the embodiments of the present invention, the processor is configured to invoke the program code stored in the memory, and is further configured to execute the following operation:

determining the coverage range class of the user equipment, where the coverage range class is used to represent a coverage degree of the base station for the user equipment.

With reference to the second aspect of the embodiments of the present invention or the first possible implementation manner of the second aspect of the embodiments of the present invention, in a second possible implementation manner of the second aspect of the embodiments of the present invention, a specific manner in which the processor determines the radio superframe identifier of the paging message that is of the user equipment and that is in the physical layer frame is:

determining, according to formula (1), the radio superframe identifier of the paging message that is of the user equipment and that is in the physical layer frame, where formula (1) is:

$SFN \bmod T = (T \text{ div } N)*(UE\_ID \bmod N)$, where

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

With reference to the second possible implementation manner of the second aspect of the embodiments of the present invention, in a third possible implementation manner of the second aspect of the embodiments of the present invention, when the first location identifier is the downlink control information interval identifier, the first location identifier is used to indicate a downlink control information interval of the paging message in the radio superframe; and a specific manner in which the processor determines, based on the radio superframe identifier, the first location identifier of the paging message in the radio superframe is:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$I\_S_1 = \text{floor}(UE\_ID/Y) \bmod Ns_i$, and formula (3) is:

$I\_S_1 = \text{floor}(UE\_ID/Y) \bmod (Ns_w * R\_class\_worst / R\_class\_i)$, where $I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

With reference to the second possible implementation manner of the second aspect of the embodiments of the present invention, in a fourth possible implementation manner of the second aspect of the embodiments of the present invention, when the first location identifier is the radio frame identifier, the first location identifier is used to indicate a radio frame of the paging message in the radio superframe; and a specific manner in which the processor determines, based on the radio superframe identifier, the first location identifier of the paging message in the radio superframe is:

determining, based on the radio superframe identifier, the radio superframe in which the paging message is located; and determining, according to formula (4), a radio frame identifier of the radio frame of the paging message in the radio superframe, where formula (4) is:

$I\_S_2 = \text{floor}(UE\_ID/Y) \bmod Ns_i$, where $I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

With reference to any implementation manner of the first possible implementation manner, the second possible implementation manner, the third possible implementation manner, or the fourth possible implementation manner of the second aspect of the embodiments of the present invention, in a fifth possible implementation manner of the second aspect of the embodiments of the present invention, a specific manner in which the processor determines the coverage range class of the user equipment is:

acquiring the coverage range class of the user equipment from uplink data sent by the user equipment; or detecting access performance of uplink information of the user equipment in different coverage range classes, and selecting the coverage range class of the user equipment according to the access performance; or determining that a coverage range class of the user equipment stored in the base station is the coverage range class of the user equipment; or acquiring the coverage range class of the user equipment from a core network, where the core network stores a coverage range class of the user equipment that is sent by the base station to the core network when the user equipment changes from a connected state to an idle state, or the core network stores a coverage range class of the user equipment that is sent by the user equipment to the core network when the user equipment changes from a connected state to an idle state.

With reference to the third possible implementation manner of the second aspect of the embodiments of the present invention, in a sixth possible implementation manner of the second aspect of the embodiments of the present invention, the downlink control information interval includes a data part used for carrying the paging message.

With reference to the sixth possible implementation manner of the second aspect of the embodiments of the present invention, in a seventh possible implementation manner of the second aspect of the embodiments of the present invention, the downlink control information interval further includes a downlink control information scheduling part, the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

With reference to the second aspect of the embodiments of the present invention, in an eighth possible implementation manner of the second aspect of the embodiments of the present invention, the paging message includes a paging message list and a message change indication, the paging message list includes a user equipment identifier of each user equipment and a paging domain of each user equipment, and user equipment identifiers of different user equipments are different; or the paging message includes at least two group paging lists, and includes a message change indication and a list identifier of each group paging list, where each group paging list includes a user equipment identifier and a corresponding paging domain that are of user equipment in the group paging list, and user equipment identifiers of different user equipments are different.

With reference to the eighth possible implementation manner of the second aspect of the embodiments of the present invention, in a ninth possible implementation manner of the second aspect of the embodiments of the present invention, the message change indication includes at least one of a system message change indication, an earthquake and tsunami warning system change indication, a commercial mobile alert service change indication, or an extended access barring parameter change indication.

A third aspect of the embodiments of the present invention discloses user equipment, including:

a determining module, configured to: determine a radio superframe identifier of a paging message that is of the user equipment and that is in a physical layer frame, and determine, based on the radio superframe identifier, a first location identifier of the paging message in the radio superframe, where the radio superframe identifier is used to indicate the radio superframe in which the paging message is located, the first location identifier is used to indicate a target location of the paging message in the radio superframe, and the first location identifier includes a downlink control information interval identifier or a radio frame identifier; and an input module, configured to receive, on a paging channel corresponding to a coverage range class of the user equipment, the physical layer frame that carries the paging message and that is sent by a base station.

In a first possible implementation manner of the third aspect of the embodiments of the present invention, a specific manner in which the determining module determines the radio superframe identifier of the paging message that is of the user equipment and that is in the physical layer frame is:

determining, according to formula (1), the radio superframe identifier of the paging message that is of the user equipment and that is in the physical layer frame, where formula (1) is:

$$SFN \bmod T = (T \text{ div } N)*(UE\_ID \bmod N), \text{ where}$$

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

With reference to the first possible implementation manner of the third aspect of the embodiments of the present invention, in a second possible implementation manner of the third aspect of the embodiments of the present invention, when the first location identifier is the downlink control information interval identifier, the first location identifier is used to indicate a downlink control information interval of the paging message in the radio superframe; and a specific manner in which the determining module determines, based on the radio superframe identifier, the first location identifier of the paging message in the radio superframe is:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$$I\_S_1 = \text{floor}(UE\_ID/Y) \bmod Ns_i, \text{ and}$$

formula (3) is:

$$I\_S_1 = \text{floor}(UE\_ID/Y) \bmod (Ns_w * R\_class\_worst/R\_class\_i), \text{ where}$$

$I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

With reference to the first possible implementation manner of the third aspect of the embodiments of the present invention, in a third possible implementation manner of the third aspect of the embodiments of the present invention, when the first location identifier is the radio frame identifier, the first location identifier is used to indicate a radio frame of the paging message in the radio superframe; and a specific manner in which the determining module determines, based on the radio superframe identifier, the first location identifier of the paging message in the radio superframe is:

determining, based on the radio superframe identifier, the radio superframe in which the paging message is located; and determining, according to formula (4), a radio frame identifier of the radio frame of the paging message in the radio superframe, where formula (4) is:

$I\_S_2 = \text{floor}(UE\_ID/Y) \mod Ns_i$, where $I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

With reference to the first possible implementation manner of the third aspect of the embodiments of the present invention, in a fourth possible implementation manner of the third aspect of the embodiments of the present invention, the downlink control information interval includes a data part used for carrying the paging message.

With reference to the fourth possible implementation manner of the third aspect of the embodiments of the present invention, in a fifth possible implementation manner of the third aspect of the embodiments of the present invention, the downlink control information interval further includes a downlink control information scheduling part, the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

With reference to the third aspect of the embodiments of the present invention, in a sixth possible implementation manner of the third aspect of the embodiments of the present invention, the paging message includes a paging message list and a message change indication, the paging message list includes a user equipment identifier of each user equipment and a paging domain of each user equipment, and user equipment identifiers of different user equipments are different; or the paging message includes at least two group paging lists, and includes a message change indication and a list identifier of each group paging list, where each group paging list includes a user equipment identifier and a corresponding paging domain that are of user equipment in the group paging list, and user equipment identifiers of different user equipments are different.

With reference to the sixth possible implementation manner of the third aspect of the embodiments of the present invention, in a seventh possible implementation manner of the third aspect of the embodiments of the present invention, the message change indication includes at least one of a system message change indication, an earthquake and tsunami warning system change indication, a commercial mobile alert service change indication, or an extended access barring parameter change indication.

A fourth aspect of the embodiments of the present invention discloses user equipment, including a memory and a processor, where the memory stores a group of program code, and the processor is configured to invoke the program code stored in the memory and is configured to execute the following operations:

determining a radio superframe identifier of a paging message that is of the user equipment and that is in a physical layer frame, where the radio superframe identifier is used to indicate a radio superframe in which the paging message is located;

determining, based on the radio superframe identifier, a first location identifier of the paging message in the radio superframe, where the first location identifier is used to indicate a target location of the paging message in the radio superframe, and the first location identifier includes a downlink control information interval identifier or a radio frame identifier; and receiving, on a paging channel corresponding to a coverage range class of the user equipment, the physical layer frame that carries the paging message and that is sent by a base station.

In a first possible implementation manner of the fourth aspect of the embodiments of the present invention, a specific manner in which the processor determines the radio superframe identifier of the paging message that is of the user equipment and that is in the physical layer frame is:

determining, according to formula (1), the radio superframe identifier of the paging message that is of the user equipment and that is in the physical layer frame, where formula (1) is:

$SFN \mod T = (T \text{ div } N)*(UE\_ID \mod N)$, where

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

With reference to the first possible implementation manner of the fourth aspect of the embodiments of the present invention, in a second possible implementation manner of the fourth aspect of the embodiments of the present invention, when the first location identifier is the downlink control information interval identifier, the first location identifier is used to indicate a downlink control information interval of the paging message in the radio superframe; and a specific manner in which the processor determines, based on the radio superframe identifier, the first location identifier of the paging message in the radio superframe is:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$I\_S_1 = \text{floor}(UE\_ID/Y) \mod Ns_i$, and formula (3) is:

$I\_S_1 = \text{floor}(UE\_ID/Y) \mod (Ns_w * R\_\text{class\_worst}/R\_\text{class\_i})$, where $I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

With reference to the first possible implementation manner of the fourth aspect of the embodiments of the present invention, in a third possible implementation manner of the fourth aspect of the embodiments of the present invention, when the first location identifier is the radio frame identifier, the first location identifier is used to indicate a radio frame of the paging message in the radio superframe; and a specific manner in which the processor determines, based on the radio superframe identifier, the first location identifier of the paging message in the radio superframe is:

determining, based on the radio superframe identifier, the radio superframe in which the paging message is located; and determining, according to formula (4), a radio frame identifier of the radio frame of the paging message in the radio superframe, where formula (4) is:

$$I\_S_2 = \text{floor}(UE\_ID/Y) \bmod Ns_i, \text{ where}$$

$I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

With reference to the first possible implementation manner of the fourth aspect of the embodiments of the present invention, in a fourth possible implementation manner of the fourth aspect of the embodiments of the present invention, the downlink control information interval includes a data part used for carrying the paging message.

With reference to the fourth possible implementation manner of the fourth aspect of the embodiments of the present invention, in a fifth possible implementation manner of the fourth aspect of the embodiments of the present invention, the downlink control information interval further includes a downlink control information scheduling part, the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

With reference to the fourth aspect of the embodiments of the present invention, in a sixth possible implementation manner of the fourth aspect of the embodiments of the present invention, the paging message includes a paging message list and a message change indication, the paging message list includes a user equipment identifier of each user equipment and a paging domain of each user equipment, and user equipment identifiers of different user equipments are different; or the paging message includes at least two group paging lists, and includes a message change indication and a list identifier of each group paging list, where each group paging list includes a user equipment identifier and a corresponding paging domain that are of user equipment in the group paging list, and user equipment identifiers of different user equipments are different.

With reference to the sixth possible implementation manner of the fourth aspect of the embodiments of the present invention, in a seventh possible implementation manner of the fourth aspect of the embodiments of the present invention, the message change indication includes at least one of a system message change indication, an earthquake and tsunami warning system change indication, a commercial mobile alert service change indication, or an extended access barring parameter change indication.

A fifth aspect of the embodiments of the present invention discloses a paging method, including:

determining, by a base station, a radio superframe identifier of a paging message that is of user equipment and that is in a physical layer frame, where the radio superframe identifier is used to indicate a radio superframe in which the paging message is located;

determining, by the base station based on the radio superframe identifier, a first location identifier of the paging message in the radio superframe, where the first location identifier is used to indicate a target location of the paging message in the radio superframe, and the first location identifier includes a downlink control information interval identifier or a radio frame identifier;

adding, by the base station based on the first location identifier, the paging message to the corresponding target location; and sending, by the base station to the user equipment and on a paging channel corresponding to a coverage range class of the user equipment, the physical layer frame that carries the paging message.

In a first possible implementation manner of the fifth aspect of the embodiments of the present invention, before the sending, by the base station to the user equipment and on a paging channel corresponding to a coverage range class of the user equipment, the physical layer frame that carries the paging message, the method further includes:

determining, by the base station, the coverage range class of the user equipment, where the coverage range class is used to represent a coverage degree of the base station for the user equipment.

With reference to the fifth aspect of the embodiments of the present invention or the first possible implementation manner of the fifth aspect of the embodiments of the present invention, in a second possible implementation manner of the fifth aspect of the embodiments of the present invention, the determining, by the base station, a radio superframe identifier of a paging message that is of user equipment and that is in a physical layer frame includes:

determining, by the base station according to formula (1), the radio superframe identifier of the paging message that is of the user equipment and that is in the physical layer frame, where formula (1) is:

$$SFN \bmod T = (T \text{ div } N)*(UE\_ID \bmod N), \text{ where}$$

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

With reference to the second possible implementation manner of the fifth aspect of the embodiments of the present invention, in a third possible implementation manner of the fifth aspect of the embodiments of the present invention, when the first location identifier is the downlink control information interval identifier, the first location identifier is used to indicate a downlink control information interval of the paging message in the radio superframe; and the determining, by the base station based on the radio superframe identifier, a first location identifier of the paging message in the radio superframe includes:

determining, by the base station based on the radio superframe identifier, the radio superframe in which the paging message is located; and determining, by the base station according to formula (2) or formula (3), a downlink control information interval identifier of the downlink control information interval of the paging message in the radio superframe, where formula (2) is:

$I\_S_1 = \text{floor}(UE\_ID/Y) \bmod Ns_i$, and formula (3) is:

$I\_S_1 = \text{floor}(UE\_ID/Y) \bmod (Ns_w * R\_class\_worst / R\_class\_i)$, where $I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

With reference to the second possible implementation manner of the fifth aspect of the embodiments of the present invention, in a fourth possible implementation manner of the fifth aspect of the embodiments of the present invention, when the first location identifier is the radio frame identifier, the first location identifier is used to indicate a radio frame of the paging message in the radio superframe; and the determining, by the base station based on the radio superframe identifier, a first location identifier of the paging message in the radio superframe includes:

determining, by the base station based on the radio superframe identifier, the radio superframe in which the paging message is located; and determining, by the base station according to formula (4), a radio frame identifier of the radio frame of the paging message in the radio superframe, where formula (4) is:

$I\_S_2 = \text{floor}(UE\_ID/Y) \bmod Ns_i$, where $I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

With reference to any implementation manner of the first possible implementation manner, the second possible implementation manner, the third possible implementation manner, or the fourth possible implementation manner of the fifth aspect of the embodiments of the present invention, in a fifth possible implementation manner of the fifth aspect of the embodiments of the present invention, the determining, by the base station, the coverage range class of the user equipment includes:

acquiring, by the base station, the coverage range class of the user equipment from uplink data sent by the user equipment; or detecting, by the base station, access performance of uplink information of the user equipment in different coverage range classes, and selecting the coverage range class of the user equipment according to the access performance; or determining, by the base station, that a coverage range class of the user equipment stored in the base station is the coverage range class of the user equipment; or acquiring, by the base station, the coverage range class of the user equipment from a core network, where the core network stores a coverage range class of the user equipment that is sent by the base station to the core network when the user equipment changes from a connected state to an idle state, or the core network stores a coverage range class of the user equipment that is sent by the user equipment to the core network when the user equipment changes from a connected state to an idle state.

With reference to the third possible implementation manner of the fifth aspect of the embodiments of the present invention, in a sixth possible implementation manner of the fifth aspect of the embodiments of the present invention, the downlink control information interval includes a data part used for carrying the paging message.

With reference to the sixth possible implementation manner of the fifth aspect of the embodiments of the present invention, in a seventh possible implementation manner of the fifth aspect of the embodiments of the present invention, the downlink control information interval further includes a downlink control information scheduling part, the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

With reference to the fifth aspect of the embodiments of the present invention, in an eighth possible implementation manner of the fifth aspect of the embodiments of the present invention, the paging message includes a paging message list and a message change indication, the paging message list includes a user equipment identifier of each user equipment and a paging domain of each user equipment, and user equipment identifiers of different user equipments are different; or the paging message includes at least two group paging lists, and includes a message change indication and a list identifier of each group paging list, where each group paging list includes a user equipment identifier and a corresponding paging domain that are of user equipment in the group paging list, and user equipment identifiers of different user equipments are different.

With reference to the eighth possible implementation manner of the fifth aspect of the embodiments of the present invention, in a ninth possible implementation manner of the fifth aspect of the embodiments of the present invention, A sixth aspect of the embodiments of the present invention discloses a paging method, including:

determining, by user equipment, a radio superframe identifier of a paging message that is of the user equipment and that is in a physical layer frame, where the radio superframe identifier is used to indicate a radio superframe in which the paging message is located;

determining, by the user equipment based on the radio superframe identifier, a first location identifier of the paging message in the radio superframe, where the first location identifier is used to indicate a target location of the paging message in the radio superframe, and the first location identifier includes a downlink control information interval identifier or a radio frame identifier; and receiving, by the user equipment on a paging channel corresponding to a coverage range class of the user equipment, the physical layer frame that carries the paging message and that is sent by a base station.

In a first possible implementation manner of the sixth aspect of the embodiments of the present invention, the determining, by user equipment, a radio superframe identifier of a paging message that is of the user equipment and that is in a physical layer frame includes:

determining, by the user equipment according to formula (1), the radio superframe identifier of the paging message that is of the user equipment and that is in the physical layer frame, where formula (1) is:

$$SFN \bmod T = (T \text{ div } N) * (UE\_ID \bmod N), \text{ where}$$

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

With reference to the first possible implementation manner of the sixth aspect of the embodiments of the present invention, in a second possible implementation manner of the sixth aspect of the embodiments of the present invention, when the first location identifier is the downlink control information interval identifier, the first location identifier is used to indicate a downlink control information interval of the paging message in the radio superframe; and the determining, by the user equipment based on the radio superframe identifier, a first location identifier of the paging message in the radio superframe includes:

determining, by the user equipment based on the radio superframe identifier, the radio superframe in which the paging message is located; and determining, by the user equipment according to formula (2) or formula (3), a downlink control information interval identifier of the downlink control information interval of the paging message in the radio superframe, where formula (2) is:

$$I\_S_1 = \text{floor}(UE\_ID/Y) \bmod Ns_i, \text{ and}$$

formula (3) is:

$$I\_S_1 = \text{floor}(UE\_ID/Y) \bmod (Ns_w * R\_class\_worst/R\_class\_i), \text{ where}$$

$I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

With reference to the first possible implementation manner of the sixth aspect of the embodiments of the present invention, in a third possible implementation manner of the sixth aspect of the embodiments of the present invention, when the first location identifier is the radio frame identifier, the first location identifier is used to indicate a radio frame of the paging message in the radio superframe; and the determining, by the user equipment based on the radio superframe identifier, a first location identifier of the paging message in the radio superframe includes:

determining, by the user equipment based on the radio superframe identifier, the radio superframe in which the paging message is located; and determining, by the user equipment according to formula (4), a radio frame identifier of the radio frame of the paging message in the radio superframe, where formula (4) is:

$$I\_S_2 = \text{floor}(UE\_ID/Y) \bmod Ns_i, \text{ where}$$

$I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

With reference to the first possible implementation manner of the sixth aspect of the embodiments of the present invention, in a fourth possible implementation manner of the sixth aspect of the embodiments of the present invention, the downlink control information interval includes a data part used for carrying the paging message.

With reference to the fourth possible implementation manner of the sixth aspect of the embodiments of the present invention, in a fifth possible implementation manner of the sixth aspect of the embodiments of the present invention, the downlink control information interval further includes a downlink control information scheduling part, the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

With reference to the sixth aspect of the embodiments of the present invention, in a sixth possible implementation manner of the sixth aspect of the embodiments of the present invention, the paging message includes a paging message list and a message change indication, the paging message list includes a user equipment identifier of each user equipment and a paging domain of each user equipment, and user equipment identifiers of different user equipments are different; or the paging message includes at least two group paging lists, and includes a message change indication and a list identifier of each group paging list, where each group paging list includes a user equipment identifier and a corresponding paging domain that are of user equipment in the group paging list, and user equipment identifiers of different user equipments are different.

With reference to the sixth possible implementation manner of the sixth aspect of the embodiments of the present invention, in a seventh possible implementation manner of the sixth aspect of the embodiments of the present invention, the message change indication includes at least one of a system message change indication, an earthquake and tsunami warning system change indication, a commercial mobile alert service change indication, or an extended access barring parameter change indication.

In the embodiments of the present invention, a base station first determines a radio superframe identifier of a paging message that is of user equipment and that is in a physical layer frame, where the radio superframe identifier is used to indicate a radio superframe in which the paging message is located; then, the base station determines, based on the radio superframe identifier, a first location identifier of the paging message in the radio superframe, where the first location identifier is used to indicate a target location of the paging message in the radio superframe, and the first location identifier includes a downlink control information interval identifier or a radio frame identifier; the base station adds the paging message to the corresponding target location based on the first location identifier; finally, the base station sends, to the user equipment and on a paging channel corresponding to a coverage range class of the user equipment, the physical layer frame that carries the paging message, to complete paging for the user equipment. The embodiments of the present invention provide a paging method for a newly set physical layer frame, which meets support of a base station for a downlink service and reduces power consumption of the base station and the user equipment.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a paging method and a device, and provide a paging method for a newly set physical layer frame, which meets support of a base station for a downlink service and reduces power consumption of the base station and the user equipment. Detailed descriptions are provided below separately.

Figure 1:
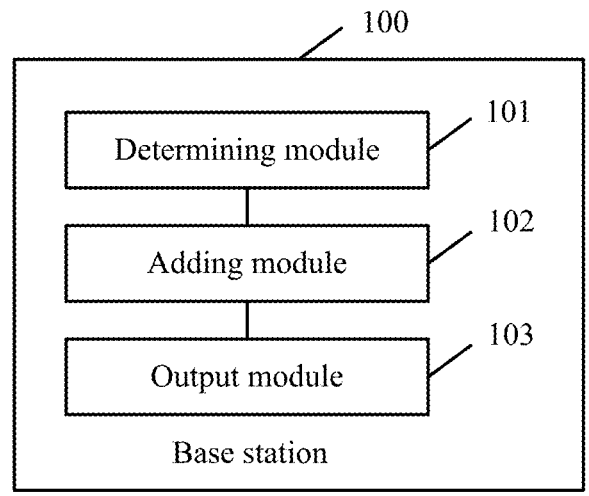
FIG. 1 is a schematic structural diagram of a base station according to an embodiment of the present invention.

Referring to FIG. 1, FIG. 1 is a schematic structural diagram of a base station according to an embodiment of the present invention. As shown in FIG. 1, the base station 100 may include a determining module 101, an adding module 102, and an output module 103.

The determining module 101 is configured to: determine a radio superframe identifier of a paging message that is of user equipment and that is in a physical layer frame, and determine, based on the radio superframe identifier, a first location identifier of the paging message in a radio superframe.

In this embodiment of the present invention, the radio superframe identifier is used to indicate the radio superframe in which the paging message is located, the first location identifier is used to indicate a target location of the paging message in the radio superframe, and the first location identifier may include a downlink control information interval identifier or a radio frame identifier.

In this embodiment of the present invention, there may be one or more user equipments, and this embodiment of the present invention sets no limitation.

In this embodiment of the present invention, the physical layer frame includes a hyperframe, where one hyperframe may include power-of-2 radio superframes, and one radio superframe may include power-of-2 radio frames. In addition, multiple radio frames may form a downlink control information interval. That is, one radio superframe may also include multiple downlink control information intervals, and this embodiment of the present invention sets no limitation.

Figure 8:
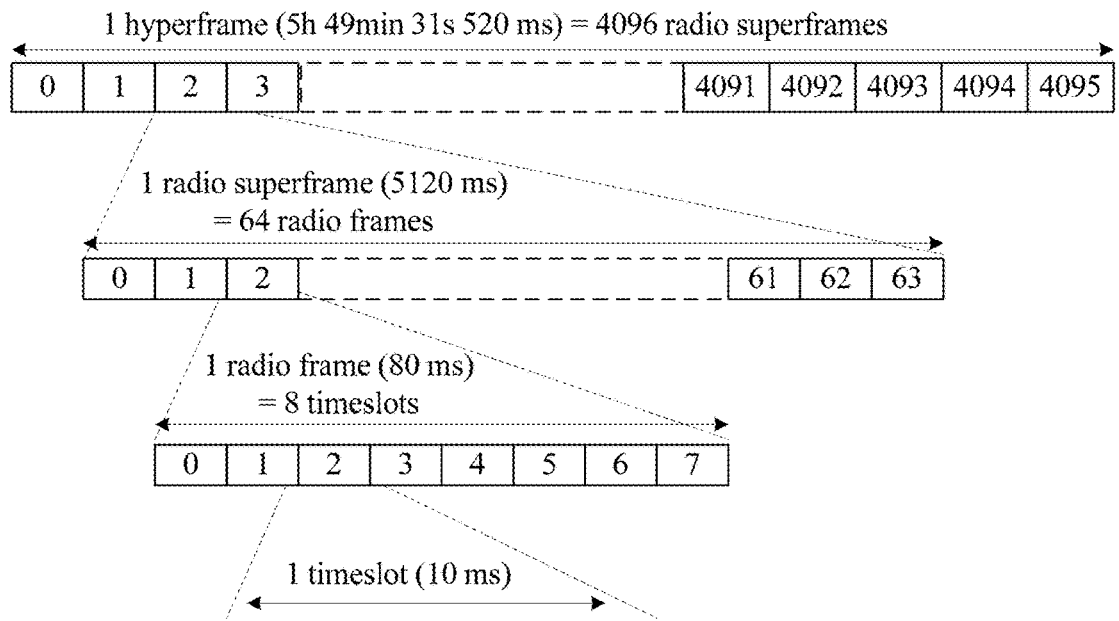
FIG. 8 is a schematic diagram of a frame structure of a physical layer frame according to an embodiment of the present invention.

For example, a frame structure of a newly set physical layer frame may be shown in FIG. 8. FIG. 8 is a schematic diagram of a frame structure of a physical layer frame according to an embodiment of the present invention. As shown in FIG. 8, one radio frame includes 8 timeslots, and a time length of each timeslot is 10 ms; one radio superframe includes 64 radio frames, and a time length of each radio superframe is 5120 ms; and one hyperframe includes 4096 radio superframes, and a time length of each hyperframe is up to more than 5 hours.

In an optional implementation manner, a specific manner in which the determining module 101 determines the radio superframe identifier of the paging message that is of the user equipment and that is in the physical layer frame is:

determining, according to formula (1), the radio superframe identifier of the paging message that is of the user equipment and that is in the physical layer frame, where formula (1) is:

$$SFN \bmod T = (T \text{ div } N)*(UE\_ID \bmod N), \text{ where}$$

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes. "mod" represents a modulo operation, "div" represents an exact division operation, and "*" represents a multiplication operation. That is, formula (1) may be described as: SFN modulo T is equal to a product of a first result obtained after T is exactly divided by N and a second result obtained after UE_ID modulo N.

Optionally, the base station 100 may determine SFN from a corresponding table according to a correspondence among T, N, and UE_ID.

In this embodiment of the present invention, the discontinuous reception paging cycle T may be a cycle specified by the user equipment, or a cycle defaulted by the base station 100, and the discontinuous reception paging cycle T is in units of radio superframes. That is, a value range of the discontinuous reception paging cycle T may be {1, 2, 4, 8, 16, 32, 64, 128, 256, 1024, 2048, 4096} radio superframes, or any subset of a set {1, 2, 4, 8, 16, 32, 64, 128, 256, 1024, 2048, 4096} radio superframes, and this embodiment of the present invention sets no limitation. In an actual application, the discontinuous reception paging cycle T may be jointly determined by a paging cycle set in an S1 interface, a paging cycle set defaulted by the base station 100, and a requirement of the user equipment on delay or power consumption. That is, when the user equipment has an extremely high requirement on delay, a value of the discontinuous reception paging cycle T may be a minimum value in the paging cycle set in the S1 interface and the paging cycle set defaulted by the base station 100; when the user equipment has an extremely high requirement on power consumption, the value of the discontinuous reception paging cycle T may be a maximum value in the paging cycle set in the S1 interface and the paging cycle set defaulted by the base station 100. That is, the value of the discontinuous reception paging cycle T may be a maximum value or a minimum value in a paging cycle set delivered by a core network and the paging cycle set defaulted by the base station 100.

In an optional implementation manner, when the first location identifier is the downlink control information interval identifier, the first location identifier is used to indicate a downlink control information interval of the paging message in the radio superframe, and a specific manner in which the determining module 101 determines, based on the radio superframe identifier, the first location identifier of the paging message in the radio superframe may be:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$$I\_S_1 = \text{floor}(UE\_ID/Y) \bmod Ns_i, \text{ and}$$

formula (3) is:

$$I\_S_1 = \text{floor}(UE\_ID/Y) \bmod (Ns_w * R\_class\_worst / R\_class\_i), \text{ where}$$

$I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle. "mod" represents a modulo operation, and "/" represents a division operation. That is, formula (2) may be described as: $I\_S_1$ is equal to a result obtained after UE_ID is divided by Y and then rounded down modulo $Ns_i$, and formula (3) may be described as: a first result obtained after UE_ID is divided by Y and then rounded down modulo a second result obtained after R_class_worst is divided by R_class_i. When Y=1, formula (2) may be simplified as:

$$I\_S_1 = UE\_ID \bmod Ns_i.$$

Optionally, the base station 100 may also determine $I\_S_1$ from a corresponding table according to a correspondence among UE_ID, Y, and $Ns_i$, and the base station 100 may further determine $I\_S_1$ from a corresponding table according to a correspondence among UE_ID, Y, $Ns_w$, R_class_worst, and R_class_i, and this embodiment of the present invention sets no limitation.

In another optional implementation manner, when the first location identifier is the radio frame identifier, the first location identifier is used to indicate a radio frame of the paging message in the radio superframe, and a specific manner in which the determining module 101 determines, based on the radio superframe identifier, the first location identifier of the paging message in the radio superframe may be:

determining, based on the radio superframe identifier, the radio superframe in which the paging message is located; and determining, according to formula (4), a radio frame identifier of the radio frame of the paging message in the radio superframe, where formula (4) is:

$$I\_S_2 = \text{floor}(UE\_ID/Y) \bmod Ns_i, \text{ where}$$

I_S$_2$ represents the radio frame identifier, Ns$_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0. "mod" represents a modulo operation, and "/" represents a division operation. That is, formula (4) may be described as: I_S$_2$ is equal to a result obtained after UE_ID is divided by Y and then rounded down modulo Ns$_i$. When Y=1, formula (4) may be simplified as:

$I\_S_1 = UE\_ID \bmod Ns_i$.

Optionally, the base station 100 may also determine I_S$_2$ from a corresponding table according to a correspondence among UE_ID, Y, and Ns$_i$.

The adding module 102 is configured to add the paging message to the corresponding target location based on the first location identifier.

In this embodiment of the present invention, when the first location identifier determined by the determining module 101 is the downlink control information interval identifier, the target location is a downlink control information interval corresponding to the downlink control information interval identifier; when the first location identifier determined by the determining module 101 is the radio frame identifier, the target location is a radio frame corresponding to the radio frame identifier.

In this embodiment of the present invention, the adding module 102 may add the paging message to a radio frame in a radio superframe of the physical layer frame, to acquire the physical layer frame that carries the paging message, or may add the paging message to a downlink control information interval in a radio superframe of the physical layer frame, to acquire the physical layer frame that carries the paging message, and this embodiment of the present invention sets no limitation.

In this embodiment of the present invention, in an optional implementation manner, the paging message may include a paging message list and a message change indication, where the paging message list includes a user equipment identifier of each user equipment that needs to be paged by the base station 100 and all or some content of a paging domain of each user equipment. That is, the paging message may include a paging message sent by the base station 100 to one or more user equipments, user equipment identifiers of different user equipments are different, and the paging domain includes a packet switched domain or a circuit switched domain.

In this embodiment of the present invention, in another optional implementation manner, the paging message may include at least two group paging lists, and include a message change indication and a list identifier of each group paging list, where each group paging list includes a user equipment identifier and a corresponding paging domain that are of user equipment in the group paging list, and user equipment identifiers of different user equipments are different.

In this embodiment of the present invention, the foregoing message change indication may include at least one of a system message change indication, an earthquake and tsunami warning system change indication, a commercial mobile alert service change indication, or an extended access barring parameter change indication.

In this embodiment of the present invention, in an optional implementation manner, the downlink control information interval may include a data part used for carrying the paging message. That is, after the determining module 101 determines the radio superframe and the downlink control information interval, in the radio superframe, used for carrying the paging message, the adding module 102 directly adds the paging message to the downlink control information interval.

In this embodiment of the present invention, in another optional implementation manner, the downlink control information interval may include a downlink control information scheduling part and a data part used for carrying the paging message, where the downlink control information scheduling part carries a second location identifier of the paging message, and the second location identifier is used to indicate a time-frequency resource location of the paging message in the data part. Optionally, the downlink control information scheduling part may further carry a paging radio network temporary identifier of the paging message, where the paging radio network temporary identifier is used to indicate that the paging message is carried in the downlink control information interval. In this embodiment of the present invention, the paging radio network temporary identifier is a fixed value that is defined in a protocol and that has a length of 1 bit to 20 bits or even larger bits, and the second location identifier may be determined by using a paging channel identifier (such as a paging channel number), a start transmission time, and transmission duration, or may be determined by using a transmission resource size. This embodiment of the present invention sets no limitation.

In this embodiment of the present invention, the foregoing downlink control information scheduling part may include a fixed downlink control information part and a variable downlink control information part, and a length of the variable downlink control information part may be determined according to a quantity of user equipments paged by the base station 100. The paging radio network temporary identifier of the paging message and the second location identifier of the paging message in the data part may be carried in the fixed downlink control information part or the variable downlink control information part, and this embodiment of the present invention sets no limitation.

The output module 103 is configured to send, to the user equipment and on a paging channel corresponding to a coverage range class of the user equipment, the physical layer frame that carries the paging message.

In this embodiment of the present invention, the output module 103 sends, to the user equipment and on the paging channel corresponding to the coverage range class of the user equipment, the physical layer frame that carries the paging message, to complete paging of the base station 100 for the user equipment.

In an optional implementation manner, the determining module 101 may further be configured to determine the coverage range class of the user equipment, where the coverage range class is used to represent a coverage degree of the base station 100 for the user equipment.

Optionally, a specific manner in which the determining module 101 determines the coverage range class of the user equipment may be:

acquiring the coverage range class of the user equipment from uplink data sent by the user equipment; or detecting access performance of uplink information of the user equipment in different coverage range classes, and selecting a coverage range class corresponding to maximum access performance as the coverage range class of the user equipment; or determining that a coverage range class of the user equipment stored in the base station 100 is the coverage range class of the user equipment; or acquiring the coverage range class of the user equipment from a core network, where the core network stores a coverage range class of the user equipment that is sent by the base station 100 to the core network when the user equipment changes from a connected state to an idle state, or the core network stores a coverage range class of the user equipment that is sent by the user equipment to the core network when the user equipment changes from a connected state to an idle state.

This embodiment of the present invention provides a paging method for a newly set physical layer frame, which meets support of a base station for a downlink service and reduces power consumption of the base station and the user equipment.

Figure 2:
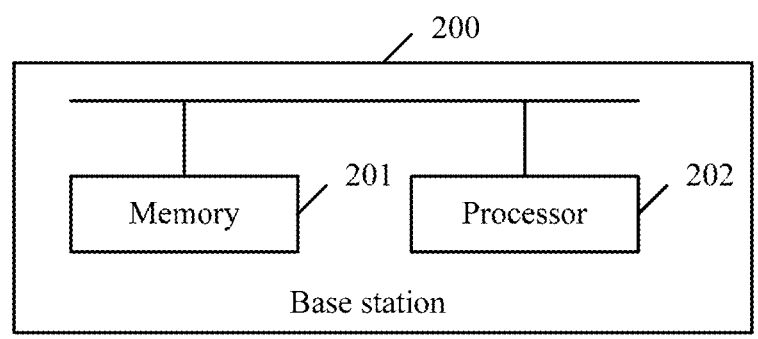
FIG. 2 is a schematic structural diagram of another base station according to an embodiment of the present invention.

Referring to FIG. 2, FIG. 2 is a schematic structural diagram of another base station according to an embodiment of the present invention. As shown in FIG. 2, the base station 200 may include a memory 201 and a processor 202, where the memory 201 stores a group of program code, and the processor 202 is configured to invoke the program code stored in the memory 201 and is configured to execute the following operations:

determining a radio superframe identifier of a paging message that is of user equipment and that is in a physical layer frame, where the radio superframe identifier is used to indicate a radio superframe in which the paging message is located;

determining, based on the radio superframe identifier, a first location identifier of the paging message in the radio superframe, where the first location identifier is used to indicate a target location of the paging message in the radio superframe, and the first location identifier includes a downlink control information interval identifier or a radio frame identifier;

adding the paging message to the corresponding target location based on the first location identifier; and sending, to the user equipment and on a paging channel corresponding to a coverage range class of the user equipment, the physical layer frame that carries the paging message.

In an embodiment, the processor 202 is configured to invoke the program code stored in the memory 201, and is further configured to execute the following operation:

determining the coverage range class of the user equipment, where the coverage range class is used to represent a coverage degree of the base station 200 for the user equipment.

In an embodiment, a specific manner in which the processor 202 determines the radio superframe identifier of the paging message that is of the user equipment and that is in the physical layer frame is:

determining, according to formula (1), the radio superframe identifier of the paging message that is of the user equipment and that is in the physical layer frame, where formula (1) is:

$SFN \bmod T = (T \bdiv N) * (UE\_ID \bmod N)$, where

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

Optionally, when the first location identifier is the downlink control information interval identifier, the first location identifier is used to indicate a downlink control information interval of the paging message in the radio superframe, and a specific manner in which the processor 202 determines, based on the radio superframe identifier, the first location identifier of the paging message in the radio superframe is:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$I\_S_1 = \text{floor}(UE\_ID/Y) \bmod Ns_i$, and formula (3) is:

$I\_S_1 = \text{floor}(UE\_ID/Y) \bmod (Ns_w * R\_\text{class\_worst}/R\_\text{class\_i})$, where $I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

Optionally, when the first location identifier is the radio frame identifier, the first location identifier is used to indicate a radio frame of the paging message in the radio superframe, and a specific manner in which the processor 202 determines, based on the radio superframe identifier, the first location identifier of the paging message in the radio superframe is:

determining, based on the radio superframe identifier, the radio superframe in which the paging message is located; and determining, according to formula (4), a radio frame identifier of the radio frame of the paging message in the radio superframe, where formula (4) is:

$I\_S_2 = \text{floor}(UE\_ID/Y) \bmod Ns_i$, where $I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

In an embodiment, a specific manner in which the processor 202 determines the coverage range class of the user equipment may be:

acquiring the coverage range class of the user equipment from uplink data sent by the user equipment; or detecting access performance of uplink information of the user equipment in different coverage range classes, and selecting a coverage range class corresponding to maximum access performance as the coverage range class of the user equipment; or determining that a coverage range class of the user equipment stored in the base station 200 is the coverage range class of the user equipment; or acquiring the coverage range class of the user equipment from a core network, where the core network stores a coverage range class of the user equipment that is sent by the base station 200 to the core network when the user equipment changes from a connected state to an idle state, or the core network stores a coverage range class of the user equipment that is sent by the user equipment to the core network when the user equipment changes from a connected state to an idle state.

Optionally, the downlink control information interval may include a data part used for carrying the paging message.

Optionally, the downlink control information interval may further include a downlink control information scheduling part, where the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

Optionally, the paging message may include a paging message list and a message change indication, where the paging message list includes a user equipment identifier of each user equipment and a paging domain of each user equipment, and user equipment identifiers of different user equipments are different.

Optionally, the paging message may include at least two group paging lists, and include a message change indication and a list identifier of each group paging list, where each group paging list includes a user equipment identifier and a corresponding paging domain that are of user equipment in the group paging list, and user equipment identifiers of different user equipments are different.

Optionally, the message change indication may include at least one of a system message change indication, an earthquake and tsunami warning system change indication, a commercial mobile alert service change indication, or an extended access barring parameter change indication.

This embodiment of the present invention provides a paging method for a newly set physical layer frame, which meets support of a base station for a downlink service and reduces power consumption of the base station and the user equipment.

Figure 3:
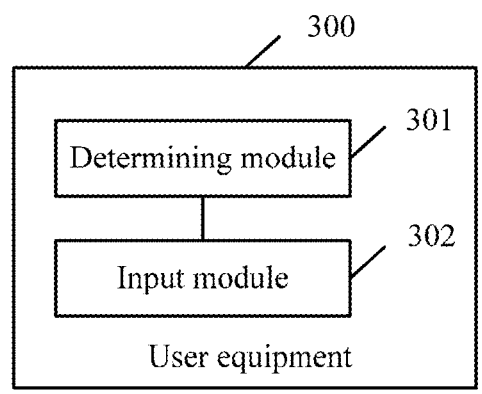
FIG. 3 is a schematic structural diagram of user equipment according to an embodiment of the present invention.

Referring to FIG. 3, FIG. 3 is a schematic structural diagram of user equipment according to an embodiment of the present invention. As shown in FIG. 3, the user equipment 300 may include a determining module 301 and a input module 302.

The determining module 301 is configured to: determine a radio superframe identifier of a paging message that is of the user equipment 300 and that is in a physical layer frame, and determine, based on the radio superframe identifier, a first location identifier of the paging message in a radio superframe.

In this embodiment of the present invention, the radio superframe identifier is used to indicate the radio superframe in which the paging message is located, the first location identifier is used to indicate a target location of the paging message in the radio superframe, and the first location identifier may include a downlink control information interval identifier or a radio frame identifier.

In an optional implementation manner, a specific manner in which the determining module 301 determines the radio superframe identifier of the paging message that is of the user equipment 300 and that is in the physical layer frame may be:

determining, according to formula (1), the radio superframe identifier of the paging message that is of the user equipment 300 and that is in the physical layer frame, where formula (1) is:

$SFN \bmod T = (T \text{ div } N) * (UE\_ID \bmod N)$, where

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes. "mod" represents a modulo operation, "div" represents an exact division operation, and "*" represents a multiplication operation. That is, formula (1) may be described as: SFN modulo T is equal to a product of a first result obtained after T is exactly divided by N and a second result obtained after UE_ID modulo N.

Optionally, the user equipment 300 may also determine SFN from a corresponding table according to a correspondence among T, N, and UE_ID.

In an optional implementation manner, when the first location identifier is the downlink control information interval identifier, the first location identifier is used to indicate a downlink control information interval of the paging message in the radio superframe, and a specific manner in which the determining module 301 determines, based on the radio superframe identifier, the first location identifier of the paging message in the radio superframe may be:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$I\_S_1 = \text{floor}(UE\_ID/Y) \bmod Ns_i$, and formula (3) is:

$I\_S_1 = \text{floor}(UE\_ID/Y) \bmod (Ns_w * R\_\text{class\_worst} / R\_\text{class}\_i)$, where $I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle. "mod" represents a modulo operation, and "/" represents a division operation. That is, formula (2) may be described as: $I\_S_1$ is equal to a result obtained after UE_ID is divided by Y and then rounded down modulo $Ns_i$, and formula (3) may be described as: a first result obtained after UE_ID is divided by Y and then rounded down modulo a second result obtained after R_class_worst is divided by R_class_i.

Optionally, the user equipment 300 may also determine I_S$_1$ from a corresponding table according to a correspondence among UE_ID, Y, and Ns$_i$, or the user equipment 300 may determine I_S$_1$ from a corresponding table according to a correspondence among UE_ID, Y, Ns$_w$, R_class_worst, and R_class_i, and this embodiment of the present invention sets no limitation.

In another optional implementation manner, when the first location identifier is the radio frame identifier, the first location identifier is used to indicate a radio frame of the paging message in the radio superframe, and a specific manner in which the determining module 301 determines, based on the radio superframe identifier, the first location identifier of the paging message in the radio superframe may be:

determining, based on the radio superframe identifier, the radio superframe in which the paging message is located; and determining, according to formula (4), a radio frame identifier of the radio frame of the paging message in the radio superframe, where formula (4) is:

$$I\_S_2 = \text{floor}(UE\_ID/Y) \bmod Ns_i, \text{ where}$$

I_S$_2$ represents the radio frame identifier, Ns$_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0. "mod" represents a modulo operation, and "/" represents a division operation. That is, formula (4) may be described as: I_S$_2$ is equal to a result obtained after UE_ID is divided by Y and then rounded down modulo Ns$_i$.

Optionally, the user equipment 300 may also determine I_S$_2$ from a corresponding table according to a correspondence among UE_ID, Y, and Ns$_i$.

The input module 302 is configured to receive, on a paging channel corresponding to a coverage range class of the user equipment 300, the physical layer frame that carries the paging message and that is sent by a base station.

Optionally, the downlink control information interval may include a data part used for carrying the paging message.

Optionally, the downlink control information interval further includes a downlink control information scheduling part, where the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

In an optional implementation manner, the paging message may include a paging message list and a message change indication, where the paging message list includes a user equipment identifier of each user equipment 300 and a paging domain of each user equipment 300, and user equipment identifiers of different user equipments 300 are different.

In another optional implementation manner, the paging message may include at least two group paging lists, and include a message change indication and a list identifier of each group paging list, where each group paging list includes a user equipment identifier and a corresponding paging domain that are of user equipment 300 in the group paging list, and user equipment identifiers of different user equipments 300 are different.

In this embodiment of the present invention, the foregoing message change indication may include at least one of a system message change indication, an earthquake and tsunami warning system change indication, a commercial mobile alert service change indication, or an extended access barring parameter change indication.

This embodiment of the present invention provides a paging method for a newly set physical layer frame, which meets support of a base station for a downlink service and reduces power consumption of the base station and the user equipment.

Figure 4:
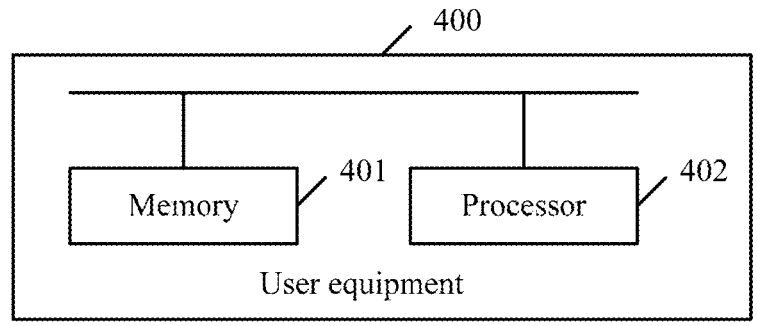
FIG. 4 is a schematic structural diagram of another user equipment according to an embodiment of the present invention.

Referring to FIG. 4, FIG. 4 is a schematic structural diagram of another user equipment according to an embodiment of the present invention. As shown in FIG. 4, the user equipment 400 may include a memory 401 and a processor 402, where the memory 401 stores a group of program code, and the processor 402 is configured to invoke the program code stored in the memory 401 and is configured to execute the following operations:

determining a radio superframe identifier of a paging message that is of the user equipment 400 and that is in a physical layer frame, where the radio superframe identifier is used to indicate a radio superframe in which the paging message is located;

determining, based on the radio superframe identifier, a first location identifier of the paging message in the radio superframe, where the first location identifier is used to indicate a target location of the paging message in the radio superframe, and the first location identifier includes a downlink control information interval identifier or a radio frame identifier; and receiving, on a paging channel corresponding to a coverage range class of the user equipment 400, the physical layer frame that carries the paging message and that is sent by a base station.

In an embodiment, a specific manner in which the processor 402 determines the radio superframe identifier of the paging message that is of the user equipment 400 and that is in the physical layer frame is:

determining, according to formula (1), the radio superframe identifier of the paging message that is of the user equipment 400 and that is in the physical layer frame, where formula (1) is:

$$SFN \bmod T = (T \text{ div } N)*(UE\_ID \bmod N), \text{ where}$$

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

Optionally, when the first location identifier is the downlink control information interval identifier, the first location identifier is used to indicate a downlink control information interval of the paging message in the radio superframe, and a specific manner in which the processor 402 determines, based on the radio superframe identifier, the first location identifier of the paging message in the radio superframe is:

determining, based on the radio superframe identifier, the radio superframe in which the paging message is located; and determining, according to formula (2) or formula (3), a downlink control information interval identifier of the downlink control information interval of the paging message in the radio superframe, where formula (2) is:

$$I\_S_1 = \text{floor}(UE\_ID/Y) \bmod Ns_i, \text{ and}$$

formula (3) is:

$$I\_S_1 = \text{floor}(UE\_ID/Y) \bmod (Ns_w * R\_class\_worst/R\_class\_i), \text{ where}$$

$I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle.

Optionally, when the first location identifier is the radio frame identifier, the first location identifier is used to indicate a radio frame of the paging message in the radio superframe, and a specific manner in which the processor 402 determines, based on the radio superframe identifier, the first location identifier of the paging message in the radio superframe is:

determining, based on the radio superframe identifier, the radio superframe in which the paging message is located; and determining, according to formula (4), a radio frame identifier of the radio frame of the paging message in the radio superframe, where formula (4) is:

$$I\_S_2 = \text{floor}(UE\_ID/Y) \bmod Ns_i, \text{ where}$$

$I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0.

In an embodiment, the downlink control information interval may include a data part used for carrying the paging message.

In another embodiment, the downlink control information interval may further include a downlink control information scheduling part, where the downlink control information scheduling part carries a paging radio network temporary identifier of the paging message and a second location identifier of the paging message, the paging radio network temporary identifier is used to indicate that the paging message is carried in the downlink control information interval, and the second location identifier is used to indicate a time-frequency resource location of the paging message in the data part.

In an embodiment, the paging message may include a paging message list and a message change indication, where the paging message list includes a user equipment identifier of each user equipment and a paging domain of each user equipment, and user equipment identifiers of different user equipments are different.

In another embodiment, the paging message may include at least two group paging lists, and include a message change indication and a list identifier of each group paging list, where each group paging list includes a user equipment identifier and a corresponding paging domain that are of user equipment in the group paging list, and user equipment identifiers of different user equipments are different.

Optionally, the message change indication may include at least one of a system message change indication, an earthquake and tsunami warning system change indication, a commercial mobile alert service change indication, or an extended access barring parameter change indication.

This embodiment of the present invention provides a paging method for a newly set physical layer frame, which meets support of a base station for a downlink service and reduces power consumption of the base station and the user equipment.

Figure 5:
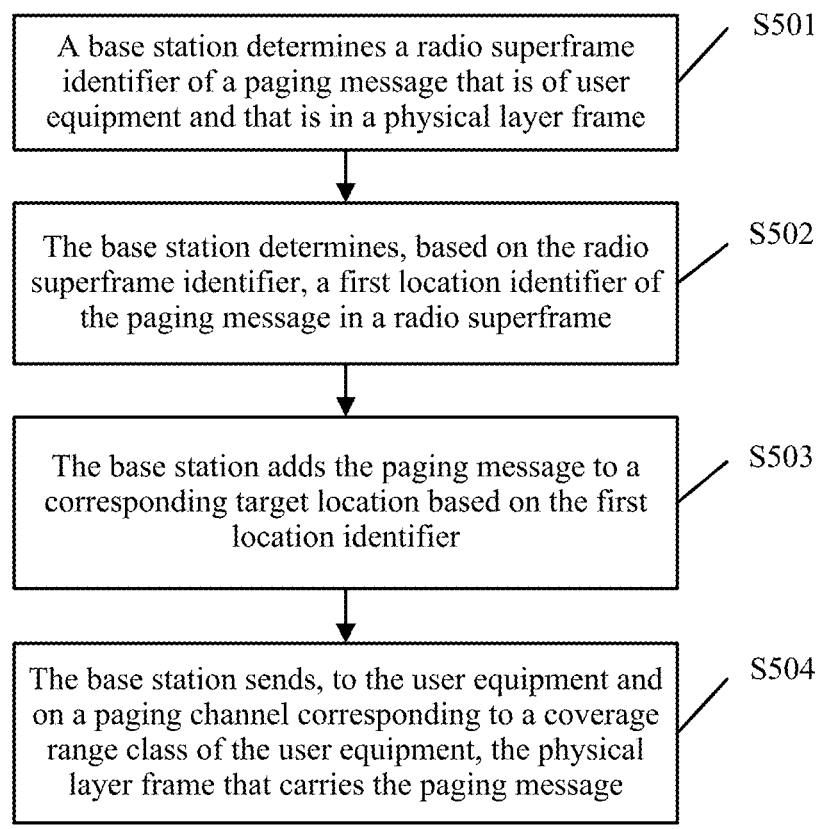
FIG. 5 is a schematic flowchart of a paging method according to an embodiment of the present invention.

Referring to FIG. 5, FIG. 5 is a schematic flowchart of a paging method according to an embodiment of the present invention. The method shown in FIG. 5 may be implemented by using the base station shown in FIG. 1 or FIG. 2. As shown in FIG. 5, the paging method may include the following steps:

S501: A base station determines a radio superframe identifier of a paging message that is of user equipment and that is in a physical layer frame.

In this embodiment of the present invention, the radio superframe identifier is used to indicate a radio superframe in which the paging message is located.

In this embodiment of the present invention, there may be one or more user equipments, and this embodiment of the present invention sets no limitation.

In this embodiment of the present invention, the physical layer frame includes a hyperframe, where one hyperframe may include power-of-2 radio superframes, and one radio superframe may include power-of-2 radio frames. In addition, multiple radio frames may form a downlink control information interval. That is, one radio superframe may also include multiple downlink control information intervals, and this embodiment of the present invention sets no limitation. For example, a frame structure of a newly set physical layer frame may be shown in FIG. 8. FIG. 8 is a schematic diagram of a frame structure of a physical layer frame according to an embodiment of the present invention. As shown in FIG. 8, one radio frame includes 8 timeslots, and a time length of each timeslot is 10 ms; one radio superframe includes 64 radio frames, and a time length of each radio superframe is 5120 ms; and one hyperframe includes 4096 radio superframes, and a time length of each hyperframe is up to more than 5 hours.

In an optional implementation manner, a specific manner in which the base station determines the radio superframe identifier of the paging message that is of the user equipment and that is in the physical layer frame may be:

determining, by the base station according to formula (1), the radio superframe identifier of the paging message that is of the user equipment and that is in the physical layer frame, where formula (1) is:

$$SFN \bmod T = (T \text{ div } N)*(UE\_ID \bmod N) \quad (1), \text{ where}$$

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes. "mod" represents a modulo operation, "div" represents an exact division operation, and "*" represents a multiplication operation. That is, formula (1) may be described as: SFN modulo T is equal to a product of a first result obtained after T is exactly divided by N and a second result obtained after UE_ID modulo N.

In this embodiment of the present invention, the discontinuous reception paging cycle T may be a cycle specified by the user equipment, or a cycle defaulted by the base station, and the discontinuous reception paging cycle T is in units of radio superframes. That is, a value range of the discontinuous reception paging cycle T may be {1, 2, 4, 8, 16, 32, 64, 128, 256, 1024, 2048, 4096} radio superframes, or any subset of a set {1, 2, 4, 8, 16, 32, 64, 128, 256, 1024, 2048, 4096} radio superframes, and this embodiment of the present invention sets no limitation. In an actual application, the discontinuous reception paging cycle T may be jointly determined by a paging cycle set in an S1 interface, a paging cycle set defaulted by the base station, and a requirement of the user equipment on delay or power consumption. That is, when the user equipment has an extremely high requirement on delay, a value of the discontinuous reception paging cycle T may be a minimum value in the paging cycle set in the S1 interface and the paging cycle set defaulted by the base station; when the user equipment has an extremely high requirement on power consumption, the value of the discontinuous reception paging cycle T may be a maximum value in the paging cycle set in the S1 interface and the paging cycle set defaulted by the base station. That is, the value of the discontinuous reception paging cycle T may be a maximum value or a minimum value in a paging cycle set delivered by a core network and the paging cycle set defaulted by the base station.

In this embodiment of the present invention, the user equipment identifier UE_ID may be an international mobile subscriber identity (IMSI), or any one of a temporary mobile subscriber identity (TMSI, Temporary Mobile Subscriber Identity), a globally unique temporary UE identity (GUTI), or an international mobile equipment identity (IMEI) modulo a positive integer, and this embodiment of the present invention sets no limitation.

In this embodiment of the present invention, a value range of the quantity N of radio superframes used for paging in one discontinuous reception paging cycle depends on the value range of the discontinuous reception paging cycle T, and the value range of N is any subset or a universal set of {T, T/2, ..., T/X}, and this embodiment of the present invention sets no limitation, where X is a positive integer, T/X indicates that there is one radio superframe, used for carrying a paging message, in X discontinuous reception paging cycles, and T/X is an integer greater than or equal to 1.

S502: The base station determines, based on the radio superframe identifier, a first location identifier of the paging message in a radio superframe.

In this embodiment of the present invention, the first location identifier is used to indicate a target location of the paging message in the radio superframe, and the first location identifier may include a downlink control information interval identifier or a radio frame identifier.

In an optional implementation manner, when the first location identifier is the downlink control information interval identifier, the first location identifier is used to indicate a downlink control information interval of the paging message in the radio superframe, and that the base station determines, based on the radio superframe identifier, a first location identifier of the paging message in a radio superframe may include:

determining, by the base station based on the radio superframe identifier, the radio superframe in which the paging message is located; and determining, by the base station according to formula (2) or formula (3), a downlink control information interval identifier of the downlink control information interval of the paging message in the radio superframe, where formula (2) is:

$$I\_S_1 = \text{floor}(UE\_ID/Y) \bmod Ns_i \qquad (2), \text{and}$$

formula (3) is:

$$I\_S_1 = \text{floor}(UE\_ID/Y) \bmod (Ns_w * R\_class\_worst/R\_class\_i) \qquad (3), \text{where}$$

$I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle. "mod" represents a modulo operation, and "/" represents a division operation. That is, formula (2) may be described as: $I\_S_1$ is equal to a result obtained after UE_ID is divided by Y and then rounded down modulo $Ns_i$, and formula (3) may be described as: a first result obtained after UE_ID is divided by Y and then rounded down modulo a second result obtained after R_class_worst is divided by R_class_i.

In another optional implementation manner, when the first location identifier is the radio frame identifier, the first location identifier is used to indicate a radio frame of the paging message in the radio superframe, and that the base station determines, based on the radio superframe identifier, a first location identifier of the paging message in a radio superframe may include:

determining, by the base station based on the radio superframe identifier, the radio superframe in which the paging message is located; and determining, by the base station according to formula (4), a radio frame identifier of the radio frame of the paging message in the radio superframe, where formula (4) is:

$$I\_S_2 = \text{floor}(UE\_ID/YZ) \bmod Ns_i \qquad (4), \text{where}$$

$I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0. "mod" represents a modulo operation, and "/" represents a division operation. That is, formula (4) may be described as: $I\_S_2$ is equal to a result obtained after UE_ID is divided by Y and then rounded down modulo $Ns_i$.

In this embodiment of the present invention, when the first location identifier is the radio frame identifier, that is, when the base station adds the paging message of the user equipment to a radio frame, the base station may preset some radio frames at fixed locations in one radio superframe as radio frames for carrying the paging message, and radio frame identifiers of the radio frames at fixed locations may form a fixed radio frame identifier set. A value of the radio frame identifier $I\_S_2$ calculated by using formula (4) is a subset of the foregoing fixed radio frame identifier set.

In this embodiment of the present invention, the base station has different capabilities for sending a downlink message to user equipments of different coverage range classes. Therefore, for a paging channel corresponding to user equipment with a larger coverage degree, to reduce a paging load of each downlink control information interval, the base station sends paging messages on more downlink control information intervals; for a paging channel corresponding to user equipment with a smaller coverage degree, because the base station needs to send a paging message on the corresponding paging channel for multiple times, extremely low efficiency of sending the paging message by the base station is caused. Therefore, the base station sets, for paging channels of different coverage range classes, different quantities of downlink control information intervals for carrying a paging message. That is, a quantity of downlink control information intervals used for carrying a paging message that are set for a paging channel of a coverage range class i is $Ns_i$, where a value 0 of i represents a normal coverage range class, and a value greater than 0 of i represents an extended coverage range class. In an optional implementation manner, a value range of $Ns_i$ may be shown as follows:

When i=0, a value range of $Ns_0$ is any value in a set $\{1, 2, 4, \ldots, \text{DCI interval\_class } i_{max}/\text{DCI interval\_class } 0\}$, where DCI interval_class 0 represents a downlink control information interval length (also referred to as a downlink control information scheduling cycle) corresponding to a paging channel of a coverage range class 0, DCI interval_class $i_{max}$ is a downlink control information interval length corresponding to a paging channel of a coverage range class of a maximum value $i_{max}$, and DCI interval_class $i_{max}$ may be a fixed value preset by the base station, and this embodiment of the present invention sets no limitation.

When $0<i<i_{max}$, the value range of $Ns_i$ is any value in a set $\{1, 2, 4, \ldots, \text{DCI interval\_class } i_{max}/\text{DCI interval\_class } i\}$, where DCI interval_class i represents a downlink control information interval length corresponding to a paging channel of a coverage range class i.

In another optional implementation manner, a value range of $Ns_i$ may be shown as follows:

When $0<i<i_{max}$, the value range of $Ns_i$ is any value in a set $\{1, 2, 4, \ldots, R\_class\_worst/R\_class\_i\}*Ns_w$, where $Ns_w$ represents a quantity of downlink control information intervals, in one radio superframe, used for carrying a paging message of user equipment of a maximum coverage range class $i_{max}$, R_class_worst represents a quantity of times for sending the paging message of the user equipment of the maximum coverage range class $i_{max}$ in one downlink control information interval, and R_class_i represents a quantity of times for sending a paging message of user equipment of a coverage range class i ($i<i_{max}$) in one downlink control information interval.

In addition, user equipments of multiple coverage range classes may share one paging channel. That is, the shared paging channel is corresponding to multiple downlink control information interval lengths. In this case, a value range of a quantity $N_{mix}$ of downlink control information intervals, on the shared paging channel, used for carrying a paging message is $\{1, 2, \ldots, L\}$, where L represents a sum of quantities of downlink control information intervals, on the shared paging channel, corresponding to coverage range classes, and paging locations corresponding to the $N_{mix}$ downlink control information intervals may be presented in a form of a bitmap file (Bitmap), or be presented in another manner specified in a protocol, and this embodiment of the present invention sets no limitation.

For example, the paging locations corresponding to the $N_{mix}$ downlink control information intervals are presented in the form of a bitmap file. It is assumed that coverage range classes that share one paging channel are separately a coverage range class 0 (normal coverage range class), a coverage range class 1, and a coverage range class 2 (maximum coverage range class), DCI interval_class $i_2$ of the coverage range class 2 is 32 times of DCI interval_class 0 of the normal coverage range class, DCI interval_class $i_1$ of the coverage range class 1 is 4 times of the DCI interval_class 0 of the normal coverage range class, and "1" is used to indicate that a paging message is carried in a downlink control information interval; a specific bitmap file is designed as follows:

1. A bitmap of a paging location corresponding to a downlink control information interval of the coverage range class 2 is: 1000 0000 0000 0000 0000 0000 0000 0000.

2. A maximum quantity of paging times for user equipment of the coverage range class 1 on the shared paging channel is 8. When a quantity of paging times is 8, a bitmap of paging locations corresponding to the downlink control information intervals is: 1000 1000 1000 1000 1000 1000 1000 1000; when a quantity of paging times is 5, a bitmap of paging locations corresponding to downlink control information intervals is: 1000 0000 0000 1000 0000 1000 1000 1000.

3. A maximum quantity of paging times for user equipment of the coverage range class 0 on the shared paging channel is 32. When a quantity of paging times is 32, a bitmap of paging locations corresponding to downlink control information intervals is: 1111 1111 1111 1111 1111 1111 1111 1111; when a quantity of paging times is 18, a bitmap of paging locations corresponding to downlink control information intervals is: 1100 1011 1110 0000 1100 1010 1100 1111.

It is assumed that the base station uses 3*32 bit=96 bit to represent paging configuration on the shared paging channel. Using the foregoing three bitmap examples as an example, if a quantity of downlink control information intervals, on the shared paging channel, used for carrying a paging message of the user equipment of the coverage range class 0 is 18, a quantity of downlink control information intervals used for carrying a paging message of the user equipment of the coverage range class 1 is 5, and a quantity of downlink control information intervals used for carrying a paging message of user equipment of the coverage range class 2 is 1, the quantity $N_{mix}$ of downlink control information intervals, on the shared paging channel, used for carrying a paging message is 22.

In this embodiment of the present invention, it is assumed that a frame structure of a newly set physical layer frame is shown in FIG. 8, and a value range of a downlink control information interval length (which is also referred to as a downlink control information scheduling cycle, and is in units of radio frames) may be a universal set or any subset of a set {80 ms, 160 ms, 320 ms, 640 ms, 1280 ms, 2048 ms, 2560 ms, 5120 ms}, and when a downlink control information interval length of the normal coverage range class is a subset of the foregoing set, a value range of a downlink control information interval length of the extended coverage range class is any subset of {80 ms, 160 ms, 320 ms, 640 ms, 1280 ms, 2048 ms, 2560 ms, 5120 ms}*{1, 2, 3, 4, . . . , 64}.

S503: The base station adds the paging message to a corresponding target location based on the first location identifier.

In this embodiment of the present invention, when the first location identifier in step S502 is the downlink control information interval identifier, the target location is a downlink control information interval corresponding to the downlink control information interval identifier; when the first location identifier in step S502 is the radio frame identifier, the target location is a radio frame corresponding to the radio frame identifier. That is, the base station may add the paging message to a radio frame in a radio superframe of the physical layer frame, to acquire the physical layer frame that carries the paging message, or may add the paging message to a downlink control information interval in a radio superframe of the physical layer frame, to acquire the physical layer frame that carries the paging message, and this embodiment of the present invention sets no limitation.

In this embodiment of the present invention, in an optional implementation manner, the paging message may include a paging message list and a message change indication, where the paging message list includes a user equipment identifier of each user equipment that needs to be paged by the base station and all or some content of a paging domain of each user equipment. That is, the paging message may include a paging message sent by the base station to one or more user equipments, user equipment identifiers of different user equipments are different, and the paging domain includes a packet switched domain or a circuit switched domain.

In this embodiment of the present invention, in another optional implementation manner, the paging message may include at least two group paging lists, and include a message change indication and a list identifier of each group paging list, where each group paging list includes a user equipment identifier and a corresponding paging domain that are of user equipment in the group paging list, and user equipment identifiers of different user equipments are different.

In this embodiment of the present invention, the foregoing message change indication may include at least one of a system message change indication, an earthquake and tsunami warning system change indication, a commercial mobile alert service change indication, or an extended access barring parameter change indication.

Figure 9:
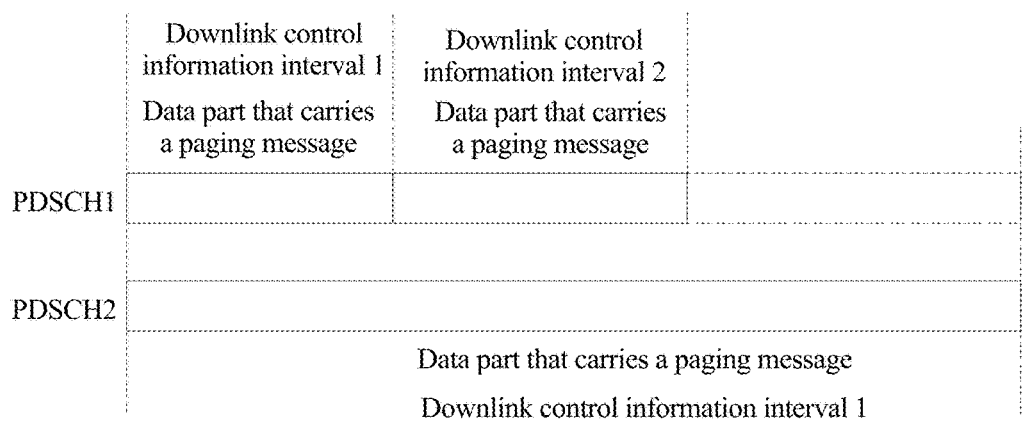
FIG. 9 is a schematic diagram of downlink control information scheduling of a paging message according to an embodiment of the present invention.

In this embodiment of the present invention, in an optional implementation manner, the downlink control information interval may include a data part used for carrying the paging message. That is, after the base station determines the radio superframe and the downlink control information interval, in the radio superframe, used for carrying the paging message, the base station directly adds the paging message to the downlink control information interval. For example, as shown in FIG. 9, FIG. 9 is a schematic diagram of downlink control information scheduling of a paging message according to an embodiment of the present invention. As shown in FIG. 9, regardless of a normal coverage range class or an extended coverage range class, a downlink control information interval includes only a data part used for carrying a paging message.

In this embodiment of the present invention, in another optional implementation manner, the downlink control information interval may include a downlink control information scheduling part and a data part used for carrying the paging message, where the downlink control information scheduling part carries a second location identifier of the paging message, and the second location identifier is used to indicate a time-frequency resource location of the paging message in the data part. Optionally, the downlink control information scheduling part may further carry a paging radio network temporary identifier of the paging message, where the paging radio network temporary identifier is used to indicate that the paging message is carried in the downlink control information interval. In this embodiment of the present invention, the paging radio network temporary identifier is a fixed value that is defined in a protocol and that has a length of 1 bit to 20 bits or even larger bits, and the second location identifier may be determined by using a paging channel identifier (such as a paging channel number), a start transmission time, and transmission duration, or may be determined by using a transmission resource size. This embodiment of the present invention sets no limitation.

Figure 10:
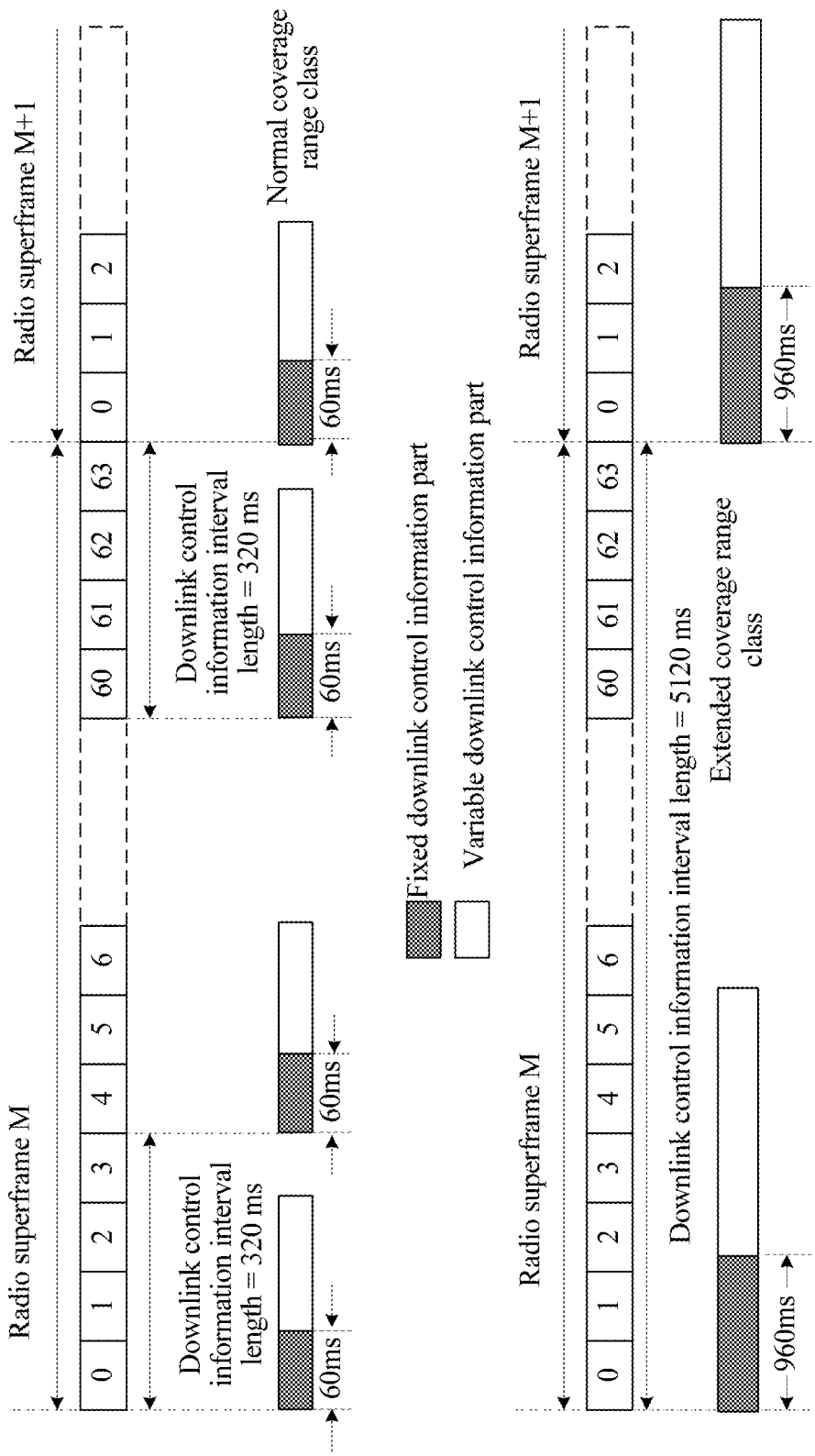
FIG. 10 is a schematic diagram of downlink control information scheduling according to an embodiment of the present invention.

In this embodiment of the present invention, the foregoing downlink control information scheduling part may include a fixed downlink control information part and a variable downlink control information part, and a length of the variable downlink control information part may be determined according to a quantity of user equipments paged by the base station. The paging radio network temporary identifier of the paging message and the second location identifier of the paging message in the data part may be carried in the fixed downlink control information part or the variable downlink control information part, and this embodiment of the present invention sets no limitation. For example, it is assumed that a schematic diagram of downlink control information scheduling of the base station is shown in FIG. 10. FIG. 10 is a schematic diagram of downlink control information scheduling according to an embodiment of the present invention. FIG. 10 includes downlink control information scheduling for user equipment of a normal coverage range class and downlink control information scheduling for user equipment of an extended coverage range class. As shown in FIG. 10, for the normal coverage range class, a radio superframe M includes 64 radio frames, and every 4 radio frames form a downlink control information interval (a length thereof is 320 ms) including a fixed downlink control information part, a variable downlink control information part, and a data part, where a length of the fixed downlink control information part is 60 ms, and the fixed downlink control information part carries a paging radio network temporary identifier of a paging message and a second location identifier of the paging message; for the extended coverage range class, a radio superframe M includes 64 radio frames, and the 64 radio frames form a downlink control information interval (a length thereof is 5120 ms) including a fixed downlink control information part, a variable downlink control information part, and a data part, where a length of the fixed downlink control information part is 960 ms, and the fixed downlink control information part carries a paging radio network temporary identifier of a paging message and a second location identifier of the paging message.

Figure 11:
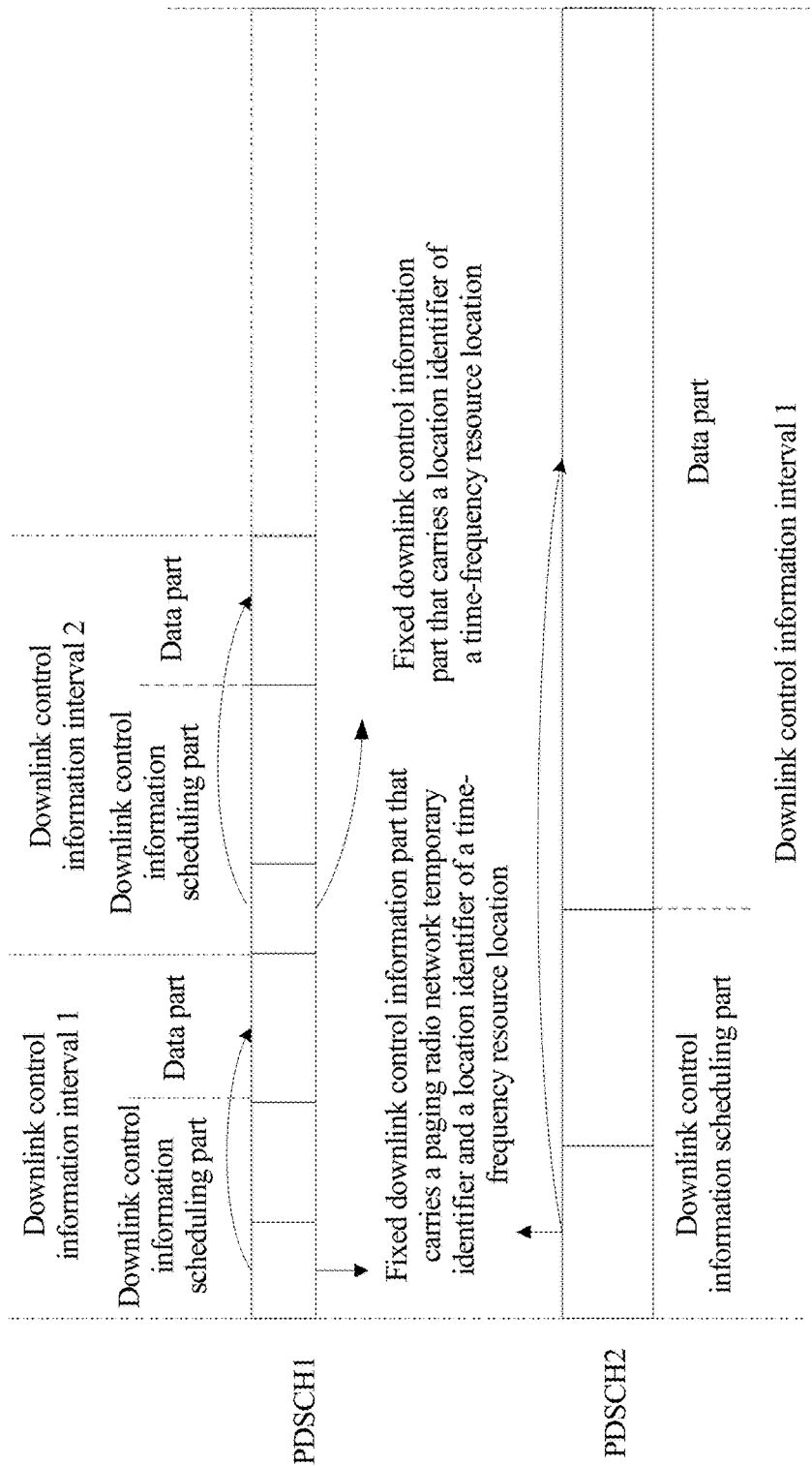
FIG. 11 is a schematic diagram of another downlink control information scheduling of a paging message according to an embodiment of the present invention.

For the schematic diagram of downlink control information scheduling shown in FIG. 10, as shown in FIG. 11, FIG. 11 is a schematic diagram of another downlink control information scheduling of a paging message according to an embodiment of the present invention. As shown in FIG. 11, a data part of a downlink control information interval carries a paging message, and a fixed downlink control information part of a downlink control information scheduling part of the downlink control information interval may include a second location identifier of the paging message. Optionally, the fixed downlink control information part may further include a paging radio network temporary identifier of the paging message.

S504: The base station sends, to the user equipment and on a paging channel corresponding to a coverage range class of the user equipment, the physical layer frame that carries the paging message.

In this embodiment of the present invention, the base station sends, to the user equipment and on the paging channel corresponding to the coverage range class of the user equipment, the physical layer frame that carries the paging message, to complete paging for the user equipment.

In this embodiment of the present invention, the base station predetermines the coverage range class of the user equipment, and a manner in which the base station determines the coverage range class of the user equipment may include:

acquiring, by the base station, the coverage range class of the user equipment from uplink data sent by the user equipment; or detecting, by the base station, access performance of uplink information of the user equipment in different coverage range classes, and selecting a coverage range class corresponding to maximum access performance as the coverage range class of the user equipment; or determining, by the base station, that a coverage range class of the user equipment stored in the base station is the coverage range class of the user equipment; or acquiring, by the base station, the coverage range class of the user equipment from a core network, where the core network stores a coverage range class of the user equipment that is sent by the base station to the core network when the user equipment changes from a connected state to an idle state, or the core network stores a coverage range class of the user equipment that is sent by the user equipment to the core network when the user equipment changes from a connected state to an idle state.

In this embodiment of the present invention, when the user equipment changes from a connected state to an idle state, the base station may reserve a context in the connected state, that is, the base station can acquire the coverage range class of the user equipment according to the reserved context, or the base station may reserve only the user equipment identifier of the user equipment and the corresponding coverage range class, or the base station may send the coverage range class of the user equipment to the core network, so that the core network stores the coverage range class of the user equipment, or the base station may transfer the coverage range class of the user equipment to the core network by using uplink signaling between the base station and a mobility management entity (MME) in the core network. When the base station needs to send a paging message to the user equipment, the MME in the core network sends a paging message to the base station, the base station acquires the coverage range class of the user equipment from the paging message sent by the MME, and the core network may send a paging message including the coverage range class of the user equipment to the base station by using downlink signaling between the core network and the base station.

Optionally, the core network may transfer the coverage range class of the user equipment by using newly defined downlink signaling or a newly defined information element (IE), and the newly defined downlink signaling or the newly defined information element is included in the paging message sent by the MME to the base station.

For example, it is assumed that the base station indicates the coverage range class of the user equipment by using an IE newly added to a user equipment context release complete (UE CONTEXT RELEASE COMPLETE) message, and the user equipment context release complete message may be shown in the following Table 1:

TABLE 1

| User equipment context release complete message | | | | | | |
|---|---|---|---|---|---|---|
| IE/Group name | Presence | Range | IE type and reference | Semantics description | Criticality | Assigned Criticality |
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| Coverage Class | M | | XXXX | | | |
| Criticality Diagnostics | O | | 9.2.1.21 | | YES | ignore |

Coverage Class is the IE newly added to the user equipment context release complete message, and is used to represent a coverage range class, and XXXX represents a value of a specific coverage range class corresponding to the user equipment.

For example, it is assumed that the MME adds an IE to the paging message delivered to the base station, to represent the coverage range class of the user equipment, and the paging message delivered by the MME to the base station may be shown in Table 2:

TABLE 2

Paging message delivered by an MME to a base station

| IE/Group name | Presence | Range | IE type and reference | Semantics description | Criticality | Assigned Criticality |
|---|---|---|---|---|---|---|
| Message Type | M | | 9.2.1.1 | | YES | ignore |
| UE Identity Index Value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | M | | | | YES | ignore |
| >TAI List Item | | 1 to <max no of TALs> | | | EACH | ignore |
| >>TAI | M | | 9.2.3.16 | | | |
| Coverage Class | M | | XXXX | | | |

Coverage Class is the IE newly added to the paging message sent by the MME to the base station, and is used to represent a coverage range class, and XXXX represents a value of a specific coverage range class corresponding to the user equipment.

For example, if the MME reuses an existing IE to send a paging message indicating the coverage range class of the user equipment to the base station, the paging message delivered by the MME to the base station may be shown in Table 3:

TABLE 3

Another paging message delivered by an MME to a base station

| IE/Group name | Presence | Range | IE type and reference | Semantics description | Criticality | Assigned Criticality |
|---|---|---|---|---|---|---|
| Message Type | M | | 9.2.1.1 | | YES | ignore |
| UE Identity Index Value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 to <max no of TALs> | | | EACH | ignore |
| >>TAI | M | | 9.2.3.16 | | | |
| CSG Id List | | 0, . . . , 1 | | | GLOBAL | ignore |
| >CSG Id | | 1 to <max no of CSG Id> | 9.2.1.62 | | | |
| Paging Priority | M | | 9.2.1.78 | | YES | ignore |

Paging Priority represents a paging priority. In Table 3, the MME re-defines Paging Priority. That is, a higher paging priority is corresponding to a smaller coverage range class. For example, the highest paging priority is corresponding to the normal coverage range class.

Figure 12:
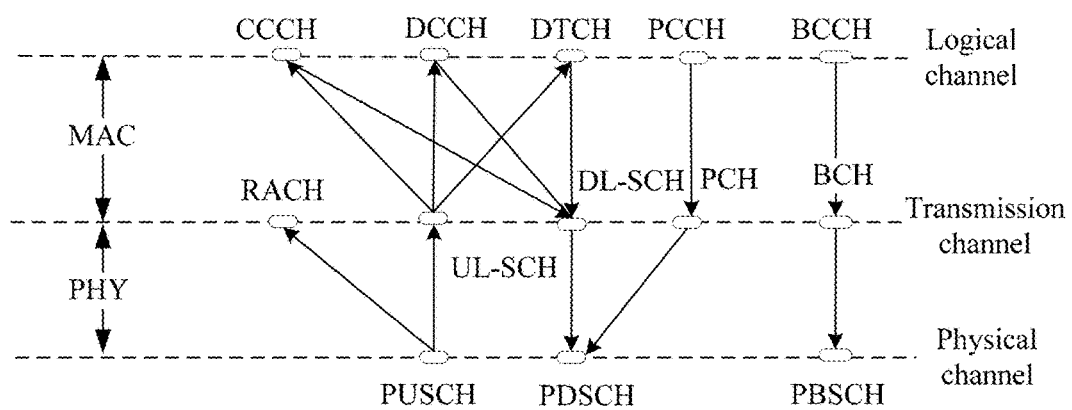
FIG. 12 is a schematic diagram of a channel mapping relationship of a paging message according to an embodiment of the present invention.

In this embodiment of the present invention, in an M2M system, the paging message is sent on a logical channel of a paging control channel (PCCH), the logical channel of the PCCH is mapped to a paging channel (PCH), a transmission channel of the PCH is mapped to a physical channel of a physical downlink shared channel (PDSCH), and a mapping relationship among the logical channel, the transmission channel, and the physical channel may be shown in FIG. 12. FIG. 12 is a schematic diagram of a channel mapping relationship of a paging message according to an embodiment of the present invention.

In this embodiment of the present invention, a base station first determines a radio superframe identifier of a paging message that is of user equipment and that is in a physical layer frame, where the radio superframe identifier is used to indicate a radio superframe in which the paging message is located; then, the base station determines, based on the radio superframe identifier, a first location identifier of the paging message in the radio superframe, where the first location identifier is used to indicate a target location of the paging message in the radio superframe, and the first location identifier includes a downlink control information interval identifier or a radio frame identifier; the base station adds the paging message to the corresponding target location based on the first location identifier; finally, the base station sends, to the user equipment and on a paging channel corresponding to a coverage range class of the user equipment, the physical layer frame that carries the paging message, to complete paging for the user equipment. This embodiment of the present invention provides a paging method for a newly set physical layer frame, which meets support of a base station for a downlink service and reduces power consumption of the base station and the user equipment.

Figure 6:
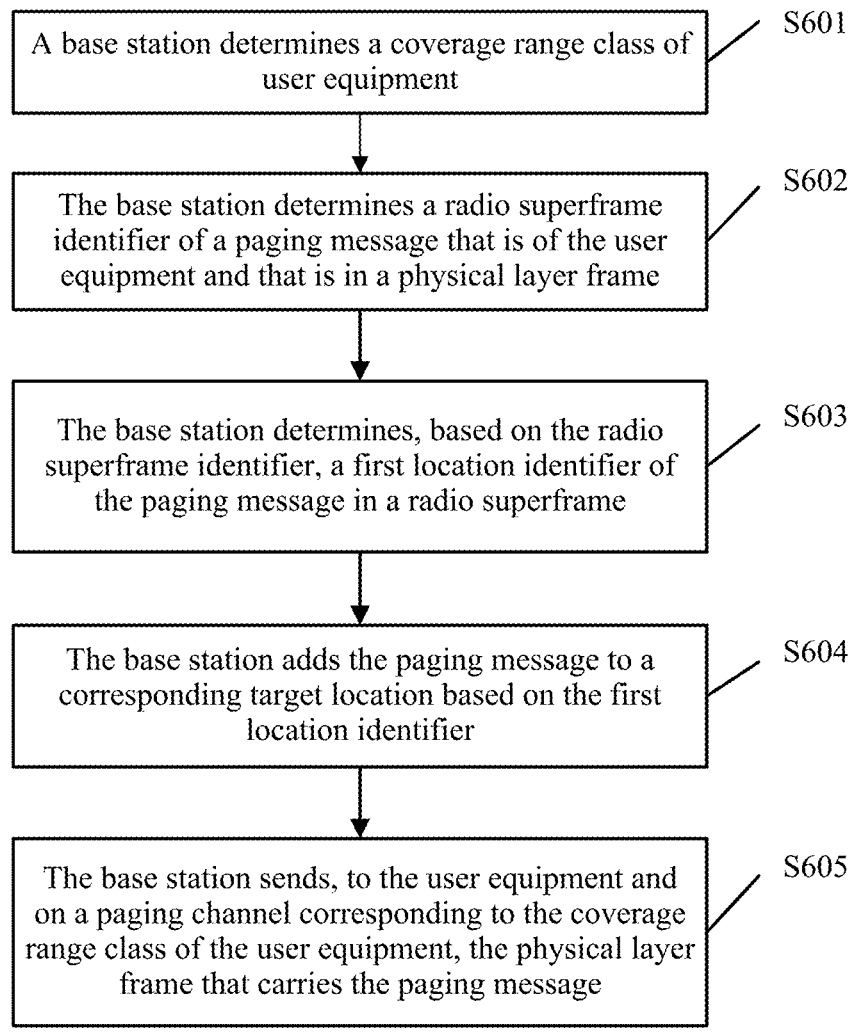
FIG. 6 is a schematic flowchart of another paging method according to an embodiment of the present invention.

Referring to FIG. 6, FIG. 6 is a schematic flowchart of another paging method according to an embodiment of the present invention. The method shown in FIG. 6 may be implemented by using the base station shown in FIG. 1 or FIG. 2. As shown in FIG. 6, the paging method may include the following steps:

S601: A base station determines a coverage range class of user equipment.

In an optional implementation manner, a manner in which the base station determines the coverage range class of the user equipment may include:

acquiring, by the base station, the coverage range class of the user equipment from uplink data sent by the user equipment; or detecting, by the base station, access performance of uplink information of the user equipment in different coverage range classes, and selecting a coverage range class corresponding to maximum access performance as the coverage range class of the user equipment; or determining, by the base station, that a coverage range class of the user equipment stored in the base station is the coverage range class of the user equipment; or acquiring, by the base station, the coverage range class of the user equipment from a core network, where the core network stores a coverage range class of the user equipment that is sent by the base station to the core network when the user equipment changes from a connected state to an idle state, or the core network stores a coverage range class of the user equipment that is sent by the user equipment to the core network when the user equipment changes from a connected state to an idle state.

S602: The base station determines a radio superframe identifier of a paging message that is of the user equipment and that is in a physical layer frame.

In this embodiment of the present invention, the radio superframe identifier is used to indicate a radio superframe in which the paging message is located.

In this embodiment of the present invention, there may be one or more user equipments, and this embodiment of the present invention sets no limitation.

S603: The base station determines, based on the radio superframe identifier, a first location identifier of the paging message in a radio superframe.

In this embodiment of the present invention, the first location identifier is used to indicate a target location of the paging message in the radio superframe, and the first location identifier may include a downlink control information interval identifier or a radio frame identifier.

In this embodiment of the present invention, when the first location identifier is the downlink control information interval identifier, the first location identifier is used to indicate a downlink control information interval of the paging message in the radio superframe; when the first location identifier is the radio frame identifier, the first location identifier is used to indicate a radio frame of the paging message in the radio superframe.

S604: The base station adds the paging message to a corresponding target location based on the first location identifier.

In this embodiment of the present invention, the base station may add the paging message to a radio frame in a radio superframe of the physical layer frame, to acquire the physical layer frame that carries the paging message, or may add the paging message to a downlink control information interval in a radio superframe of the physical layer frame, to acquire the physical layer frame that carries the paging message, and this embodiment of the present invention sets no limitation.

S605: The base station sends, to the user equipment and on a paging channel corresponding to the coverage range class of the user equipment, the physical layer frame that carries the paging message.

In this embodiment of the present invention, when the first location identifier in step S603 is the downlink control information interval identifier, the target location is a downlink control information interval corresponding to the downlink control information interval identifier; when the first location identifier in step S603 is the radio frame identifier, the target location is a radio frame corresponding to the radio frame identifier. That is, the base station may add the paging message to a radio frame in a radio superframe of the physical layer frame, to acquire the physical layer frame that carries the paging message, or may add the paging message to a downlink control information interval in a radio superframe of the physical layer frame, to acquire the physical layer frame that carries the paging message, and this embodiment of the present invention sets no limitation.

In this embodiment of the present invention, a base station first determines a coverage range class of user equipment and a radio superframe identifier of a paging message that is of the user equipment and that is in a physical layer frame, where the radio superframe identifier is used to indicate a radio superframe in which the paging message is located; then, the base station determines, based on the radio superframe identifier, a first location identifier of the paging message in the radio superframe, where the first location identifier is used to indicate a target location of the paging message in the radio superframe, and the first location identifier includes a downlink control information interval identifier or a radio frame identifier; the base station adds the paging message to the corresponding target location based on the first location identifier; finally, the base station sends, to the user equipment and on a paging channel corresponding to the coverage range class of the user equipment, the physical layer frame that carries the paging message, to complete paging for the user equipment. This embodiment of the present invention provides a paging method for a newly set physical layer frame, which meets support of a base station for a downlink service and reduces power consumption of the base station and the user equipment.

Figure 7:
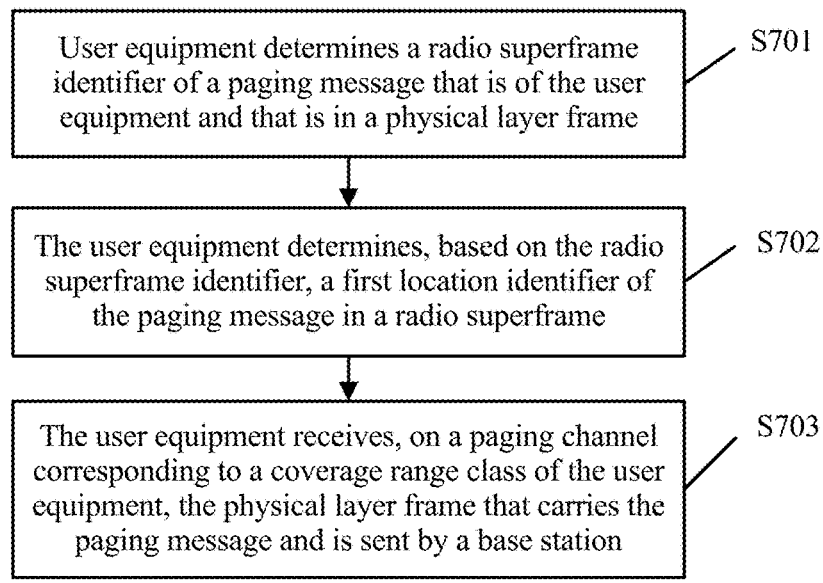
FIG. 7 is a schematic flowchart of still another paging method according to an embodiment of the present invention.

Referring to FIG. 7, FIG. 7 is a schematic flowchart of still another paging method according to an embodiment of the present invention. The method shown in FIG. 7 may be implemented by the user equipment shown in FIG. 3 or FIG. 4. As shown in FIG. 7, the paging method may include the following steps:

S701: User equipment determines a radio superframe identifier of a paging message that is of the user equipment and that is in a physical layer frame.

In this embodiment of the present invention, the radio superframe identifier is used to indicate a radio superframe in which the paging message is located.

S702: The user equipment determines, based on the radio superframe identifier, a first location identifier of the paging message in a radio superframe.

In this embodiment of the present invention, the first location identifier is used to indicate a target location of the paging message in the radio superframe, and the first location identifier may include a downlink control information interval identifier or a radio frame identifier.

In an optional implementation manner, when the first location identifier is the downlink control information interval identifier, the first location identifier is used to indicate a downlink control information interval of the paging message in the radio superframe, and that the user equipment determines, based on the radio superframe identifier, a first location identifier of the paging message in a radio superframe may include:

determining, by the user equipment based on the radio superframe identifier, the radio superframe in which the paging message is located; and determining, by the user equipment according to formula (2) or formula (3), a downlink control information interval identifier of the downlink control information interval of the paging message in the radio superframe, where formula (2) is:

$$I\_S_1 = \text{floor}(UE\_ID/Y) \bmod Ns_i \qquad (2), \text{and}$$

formula (3) is:

$$I\_S_1 = \text{floor}(UE\_ID/Y) \bmod (Ns_w * R\_class\_worst/R\_class\_i) \qquad (3), \text{where}$$

$I\_S_1$ represents the downlink control information interval identifier, $Ns_i$ represents a quantity of downlink control information intervals, within (T div N), used for carrying a paging message of user equipment of a coverage range class i, $Ns_w$ represents a quantity of downlink control information intervals, within (T div N), used for carrying a paging message of user equipment of a maximum coverage range class, R_class_worst represents a quantity of times for sending the paging message of the user equipment of the maximum coverage range class in one downlink control information interval, R_class_i represents a quantity of times for sending the paging message of the user equipment of the coverage range class i in one downlink control information interval, i is an integer greater than or equal to 0, a smaller value of i indicates a larger coverage degree, Y is an integer greater than 0, and (T div N) represents a radio superframe interval of two adjacent radio superframes in the radio superframes used for paging in one discontinuous reception paging cycle. "mod" represents a modulo operation, and "/" represents a division operation. That is, formula (2) may be described as: $I\_S_1$ is equal to a result obtained after UE_ID is divided by Y and then rounded down modulo $Ns_i$, and formula (3) may be described as: a first result obtained after UE_ID is divided by Y and then rounded down modulo a second result obtained after R_class_worst is divided by R_class_i.

In another optional implementation manner, when the first location identifier is the radio frame identifier, the first location identifier is used to indicate a radio frame of the paging message in the radio superframe, and that the user equipment determines, based on the radio superframe identifier, a first location identifier of the paging message in a radio superframe may include:

determining, by the user equipment based on the radio superframe identifier, the radio superframe in which the paging message is located; and determining, by the user equipment according to formula (4), a radio frame identifier of the radio frame of the paging message in the radio superframe, where formula (4) is:

$$I\_S_2 = \text{floor}(UE\_ID/Y) \bmod Ns_i \qquad (4), \text{where}$$

$I\_S_2$ represents the radio frame identifier, $Ns_i$ represents a quantity of radio frames, within (T div N), used for carrying a paging message of user equipment of a coverage range class i, i is an integer greater than or equal to 0, a smaller value of i indicates a larger coverage degree, and Y is an integer greater than 0. "mod" represents a modulo operation, and "/" represents a division operation. That is, formula (4) may be described as: $I\_S_2$ is equal to a result obtained after UE_ID is divided by Y and then rounded down modulo $Ns_i$.

S703: The user equipment receives, on a paging channel corresponding to a coverage range class of the user equipment, the physical layer frame that carries the paging message and that is sent by a base station.

This embodiment of the present invention provides a paging method for a newly set physical layer frame, which meets support of a base station for a downlink service and reduces power consumption of the base station and the user equipment.

It should be noted that, in the foregoing embodiments, the descriptions of the embodiments have their respective focuses. For a part that is not described in detail in an embodiment, reference may be made to related descriptions in other embodiments. In addition, a person skilled in the art should also understand that all the embodiments described in this specification belong to exemplary embodiments, and the involved actions and modules are not necessarily mandatory to the present invention.

The steps in the methods in the embodiments of the present invention may be reordered, combined, and deleted according to actual needs.

The modules in the devices in the embodiments of the present invention may be combined, divided, and deleted according to actual needs.

The modules in the embodiments of the present invention may be implemented by using a universal integrated circuit, such as a CPU (Central Processing Unit), or by using an ASIC (Application Specific Integrated Circuit).

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

The foregoing describes in detail the paging method and device according to the embodiments of the present invention. In this specification, specific examples are used to describe the principle and implementation manners of the present invention, and the description of the embodiments is only intended to help understand the present invention and the core idea of the present invention. In addition, a person of ordinary skill in the art may, based on the idea of the present invention, make modifications with respect to the specific implementation manners and the application scope. Therefore, the content of this specification shall not be construed as a limitation to the present invention.

What is claimed is:

1. A base station, comprising a processor, and a non-transitory computer-readable memory comprising computer-executable instructions that, when executed by the processor, facilitate the base station performing a method comprising:
    determining a radio superframe identifier of a paging message that is of a user equipment and that is in a physical layer frame, wherein the radio superframe identifier indicates a radio superframe in which the paging message is located;
    determining, based on the radio superframe identifier, a first location identifier of the paging message in the radio superframe, wherein the first location identifier indicates a target location of the paging message in the radio superframe, and wherein the first location identifier comprises at least one of an identifier taken from the group consisting of:
        a downlink control information interval identifier, and
        a radio frame identifier;
    adding the paging message at the target location in the radio superframe based on the first location identifier;
    acquiring a coverage range class of the user equipment from a core network that stores the coverage range class of the user equipment that is sent by the base station to the core network when the user equipment changes from a connected state to an idle state; and
    sending, to the user equipment and according to a paging channel configuration corresponding to the coverage range class of the user equipment acquired by the base station from the core network during the acquiring, the physical layer frame that carries the paging message at the target location in accordance with the paging channel configuration,
    wherein the coverage range class of the user equipment is associated with a quantity of times for sending the paging message for the user equipment in one downlink control information interval,
    wherein the one downlink control information interval is an interval between each start of two consecutive paging occasions, and
    wherein the sending the physical layer frame to the user equipment comprises a repetition of sending the one downlink control information interval within the physical layer frame according to the quantity of times.

2. The base station according to claim 1, wherein the determining the radio superframe identifier of the paging message that is of the user equipment and that is in the physical layer frame comprises:
    determining the radio superframe identifier of the paging message that is of the user equipment and that is in the physical layer frame, according to:

$SFN \bmod T = (T \operatorname{div} N) * (UE\_ID \bmod N)$, wherein

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

3. The base station according to claim 1, wherein the paging message comprises one of:
    a paging message list, comprising a user equipment identifier of each user equipment and a paging domain of each user equipment, and a message change indication; and
    at least two group paging lists, each comprising a user equipment identifier and a corresponding paging domain that are of user equipment in the group paging list, a message change indication, and a list identifier of each group paging list;
    wherein user equipment identifiers of different user equipments are different.

4. The base station according to claim 3, wherein the message change indication comprises at least one of a system message change indication, an earthquake and tsunami warning system change indication, a commercial mobile alert service change indication, and an extended access barring parameter change indication.

5. A user equipment, comprising a processor and a non-transitory computer-readable memory comprising computer-executable instructions that, when executed by the processor, facilitate performing a method comprising:
    determining a radio superframe identifier of a paging message that is of the user equipment and that is in a physical layer frame, wherein the radio superframe identifier indicates a radio superframe in which the paging message is located;
    determining, based on the radio superframe identifier, a first location identifier of the paging message in the radio superframe, wherein the first location identifier indicates a target location of the paging message in the radio superframe, and wherein the first location identifier comprises at least one of an identifier taken from the group consisting of:
        a downlink control information interval identifier, and
        a radio frame identifier,
    wherein a coverage range class of the user equipment is associated with a quantity of times for sending the paging message for the user equipment in one downlink control information interval, the coverage range class of the user equipment is acquired from a core network that stores the coverage range class of the user equipment, and the coverage range class is sent to the core network by the base station when the user equipment changes from a connected state to an idle state;
    wherein the one downlink control information interval is an interval between each start of two consecutive paging occasions; and
    receiving, according to a paging channel configuration corresponding to the coverage range class of the user equipment, the physical layer frame that carries the paging message at the target location in accordance with the paging channel configuration, and that is sent by a base station,
    wherein the receiving the physical layer frame by the user equipment comprises a repetition of receiving the one downlink control information interval within the physical layer frame according to the quantity of times.

6. The user equipment according to claim 5, wherein the determining the radio superframe identifier of the paging message that is of the user equipment and that is in the physical layer frame comprises:

determining the radio superframe identifier of the paging message that is of the user equipment and that is in the physical layer frame, according to:

$SFN \bmod T = (T \operatorname{div} N)*(UE\_ID \bmod N)$, wherein

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

7. A paging method carried out by a base station, the method comprising:
   determining a radio superframe identifier of a paging message that is of a user equipment and that is in a physical layer frame, wherein the radio superframe identifier indicates a radio superframe in which the paging message is located;
   determining, based on the radio superframe identifier, a first location identifier of the paging message in the radio superframe, wherein the first location identifier indicates a target location of the paging message in the radio superframe, and wherein the first location identifier comprises at least one of an identifier taken from the group consisting of:
      a downlink control information interval identifier, and
      a radio frame identifier;
   adding, by the base station based on the first location identifier, the paging message at the target location in the radio superframe;
   acquiring a coverage range class of the user equipment from a core network that stores the coverage range class of the user equipment that is sent by the base station to the core network when the user equipment changes from a connected state to an idle state; and
   sending, to the user equipment and according to a paging channel configuration corresponding to the coverage range class of the user equipment acquired by the base station from the core network during the acquiring, the physical layer frame that carries the paging message at the target location in accordance with the paging channel configuration,
   wherein the coverage range class of the user equipment is associated with a quantity of times for sending the paging message for the user equipment in one downlink control information interval,
   wherein the one downlink control information interval is an interval between each start of two consecutive paging occasions, and
   wherein the sending the physical frame to the user equipment comprises a repetition of sending the one downlink control information interval within the physical layer frame according to the quantity of times.

8. The method according to claim 7, wherein the determining, by the base station, the radio superframe identifier of the paging message that is of user equipment and that is in the physical layer frame comprises:
   determining the radio superframe identifier of the paging message that is of the user equipment and that is in the physical layer frame, according to:

$SFN \bmod T = (T \operatorname{div} N)*(UE\_ID \bmod N)$, wherein

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

9. A paging method, comprising:
   determining, by a user equipment, a radio superframe identifier of a paging message that is of the user equipment and that is in a physical layer frame, wherein the radio superframe identifier indicates a radio superframe in which the paging message is located;
   determining, by the user equipment based on the radio superframe identifier, a first location identifier of the paging message in the radio superframe, wherein the first location identifier indicates a target location of the paging message in the radio superframe, and wherein the first location identifier comprises at least one of an identifier taken from the group consisting of:
      a downlink control information interval identifier, and
      a radio frame identifier; and
   receiving, by the user equipment according to a paging channel configuration corresponding to a coverage range class of the user equipment, the physical layer frame that carries the paging message at the target location in accordance with the paging channel configuration, and that is sent by a base station,
   wherein the coverage range class of the user equipment is associated with a quantity of times for sending the paging message for the user equipment in one downlink control information interval, the coverage range class of the user equipment is acquired from a core network that stores the coverage range class of the user equipment, and the coverage range class is sent to the core network by the base station when the user equipment changes from a connected state to an idle state;
   wherein the one downlink control information interval is an interval between each start of two consecutive paging occasions, and
   wherein the receiving the physical layer frame by the user equipment comprises a repetition of receiving the one downlink control information interval within the physical layer frame according to the quantity of times.

10. The method according to claim 9, wherein the determining, by the user equipment, the radio superframe identifier of the paging message that is of the user equipment and that is in the physical layer frame comprises:
   determining, by the user equipment, the radio superframe identifier of the paging message that is of the user equipment and that is in the physical layer frame, according to:

$SFN \bmod T = (T \operatorname{div} N)*(UE\_ID \bmod N)$, wherein

SFN represents the radio superframe identifier, T represents a discontinuous reception paging cycle, N represents a quantity of radio superframes used for paging in one discontinuous reception paging cycle, UE_ID represents a user equipment identifier, and the discontinuous reception paging cycle is in units of radio superframes.

* * * * *